(12) United States Patent
Yamaguchi

(10) Patent No.: US 10,097,719 B2
(45) Date of Patent: Oct. 9, 2018

(54) PRINTER AND MOBILE INFORMATION PROCESSING APPARATUS

(71) Applicant: FUJI XEROX CO., LTD., Tokyo (JP)

(72) Inventor: Hiroshi Yamaguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/496,168

(22) Filed: Apr. 25, 2017

(65) Prior Publication Data

US 2018/0139342 A1 May 17, 2018

(30) Foreign Application Priority Data

Nov. 17, 2016 (JP) ................................. 2016-223752

(51) Int. Cl.
| | | |
|---|---|---|
| *H04N 1/04* | (2006.01) | |
| *H04N 1/00* | (2006.01) | |
| *G06K 15/02* | (2006.01) | |
| *G06F 3/12* | (2006.01) | |

(52) U.S. Cl.
CPC ....... *H04N 1/00973* (2013.01); *G06F 3/1203* (2013.01); *G06F 3/1236* (2013.01); *G06F 3/1268* (2013.01); *G06F 3/1286* (2013.01); *G06K 15/02* (2013.01); *H04N 1/00249* (2013.01); *H04N 1/00307* (2013.01); *H04N 1/00896* (2013.01)

(58) Field of Classification Search
CPC ......... G06F 1/325; G06F 21/608; G07F 17/26
USPC ....... 358/1.15, 1.14; 399/9, 38, 49; 709/223, 709/201, 213, 228, 238
See application file for complete search history.

(56) References Cited

U.S. PATENT DOCUMENTS

| | | | | |
|---|---|---|---|---|
| 9,191,525 | B2 * | 11/2015 | Sawayanagi | ....... H04N 1/00111 |
| 2002/0193097 | A1 * | 12/2002 | Yamaguchi | ............. H04L 29/06 |
| | | | | 455/412.1 |
| 2004/0218916 | A1 * | 11/2004 | Yamaguchi | ............ G03B 17/53 |
| | | | | 396/263 |
| 2005/0265731 | A1 | 12/2005 | Keum et al. | |
| 2007/0080827 | A1 * | 4/2007 | Huang | ................... G07B 15/02 |
| | | | | 340/945 |
| 2007/0254694 | A1 * | 11/2007 | Nakagwa | .............. G06F 1/1626 |
| | | | | 455/556.1 |
| 2013/0258424 | A1 * | 10/2013 | Ono | .................... H04N 1/00323 |
| | | | | 358/475 |

(Continued)

FOREIGN PATENT DOCUMENTS

| | | |
|---|---|---|
| JP | 2003-235081 A | 8/2003 |
| JP | 3480734 B1 | 12/2003 |

(Continued)

OTHER PUBLICATIONS

May 29, 2016 Office Action issued in Japanese Patent Application No. 2016-223752.

*Primary Examiner* — Negussie Worku
(74) *Attorney, Agent, or Firm* — Oliff PLC

(57) ABSTRACT

A printer includes an imaging unit, an imaging light unit, a transmitter, and a receiver. The transmitter transmits designation information via visible light communication by using the imaging light unit. The designation information is information for designating the printer as a destination of wireless communication. The receiver receives a print instruction from a mobile information processing apparatus via the wireless communication in accordance with the designation information.

21 Claims, 21 Drawing Sheets

(56) References Cited

U.S. PATENT DOCUMENTS

| | | |
|---|---|---|
| 2014/0218765 A1 | 8/2014 | Sawayanagi et al. |
| 2015/0103365 A1 | 4/2015 | Baba |
| 2015/0185807 A1* | 7/2015 | Okuzono ............. G06F 1/3231 |
| | | 713/320 |
| 2015/0186088 A1 | 7/2015 | Iwashima |
| 2015/0309761 A1 | 10/2015 | Hirakawa |
| 2015/0368055 A1 | 12/2015 | Kunihiro et al. |
| 2015/0370318 A1* | 12/2015 | Yamaguchi ............. G06F 3/005 |
| | | 345/157 |
| 2017/0039434 A1 | 2/2017 | Shima et al. |
| 2017/0195504 A1* | 7/2017 | Yamaguchi ........ H04N 1/00095 |
| 2017/0195512 A1* | 7/2017 | Yamaguchi ........ G06K 9/00362 |
| 2017/0195513 A1* | 7/2017 | Yamaguchi ........ H04N 1/32117 |
| 2017/0208195 A1* | 7/2017 | Yamamoto ............. G06F 3/016 |
| 2018/0101334 A1* | 4/2018 | Suzuki .................... G06F 3/121 |
| 2018/0106443 A1* | 4/2018 | Shannin ................ F21S 19/005 |
| 2018/0139342 A1* | 5/2018 | Yamaguchi ........ H04N 1/00973 |
| 2018/0150271 A1* | 5/2018 | Yamaguchi ........... G06F 3/1203 |

FOREIGN PATENT DOCUMENTS

| | | |
|---|---|---|
| JP | 2004-248128 A | 9/2004 |
| JP | 2005-341595 A | 12/2005 |
| JP | 2006-166373 A | 6/2006 |
| JP | 2007-053424 A | 3/2007 |
| JP | 2007-164400 A | 6/2007 |
| JP | 2007-189348 A | 7/2007 |
| JP | 2008-040807 A | 2/2008 |
| JP | 2008-186161 A | 8/2008 |
| JP | 2008-186402 A | 8/2008 |
| JP | 2008-245231 A | 10/2008 |
| JP | 2009-005079 A | 1/2009 |
| JP | 2009-286161 A | 12/2009 |
| JP | 2010-114492 A | 5/2010 |
| JP | 2010-130603 A | 6/2010 |
| JP | 2014-007624 A | 1/2014 |
| JP | 2014-098894 A | 5/2014 |
| JP | 2014-150474 A | 8/2014 |
| JP | 2014-180792 A | 9/2014 |
| JP | 2015-024626 A | 2/2015 |
| JP | 2015-126504 A | 7/2015 |
| JP | 2015-210592 A | 11/2015 |
| JP | 2015-210597 A | 11/2015 |
| JP | 2016-007774 A | 1/2016 |
| JP | 2016-072295 A1 | 5/2016 |
| JP | 2016-092282 A | 5/2016 |
| WO | 2004/054812 A1 | 7/2004 |

* cited by examiner

FIG. 2A
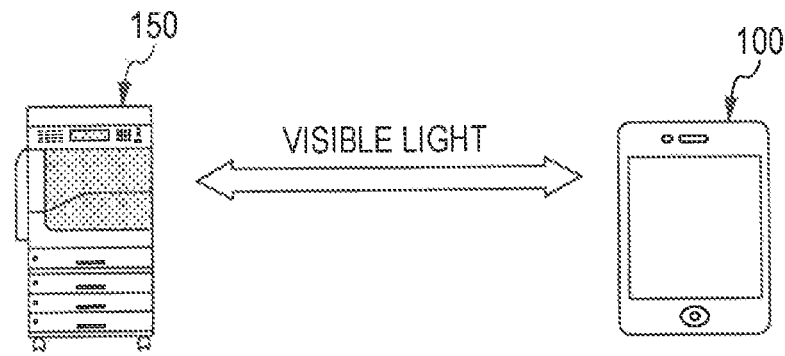
FIG. 2B1
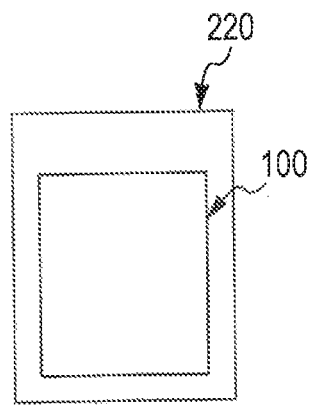
FIG. 2B2
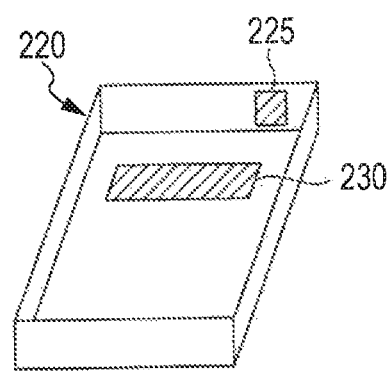
FIG. 2B3
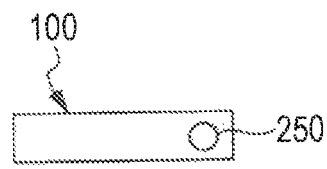
FIG. 2B4
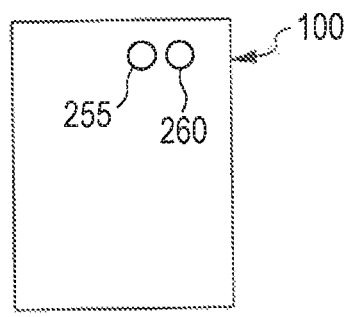

PRINTER AND MOBILE INFORMATION PROCESSING APPARATUS

CROSS-REFERENCE TO RELATED APPLICATIONS

This application is based on and claims priority under 35 USC 119 from Japanese Patent Application No. 2016-223752 filed Nov. 17, 2016.

BACKGROUND (i) Technical Field

The present invention relates to a printer and a mobile information processing apparatus.

(ii) Related Art

Mobile information processing apparatuses provide print instructions, and printers perform printing.

Some of the printers include an imaging light unit.

SUMMARY

According to an aspect of the invention, there is provided a printer including an imaging unit, an imaging light unit, a transmitter, and a receiver. The transmitter transmits designation information via visible light communication by using the imaging light unit. The designation information is information for designating the printer as a destination of wireless communication. The receiver receives a print instruction from a mobile information processing apparatus via the wireless communication in accordance with the designation information.

BRIEF DESCRIPTION OF THE DRAWINGS

An exemplary embodiment of the present invention will be described in detail based on the following figures, wherein:

FIGS. 2A and 2B1 through 2B4 illustrate an example configuration of a system according to the exemplary embodiment;

FIG. 4 is a flowchart illustrating an example process according to the exemplary embodiment;

DETAILED DESCRIPTION

An exemplary embodiment of the present invention will be described hereinafter with reference to the drawings.

Figure 1:
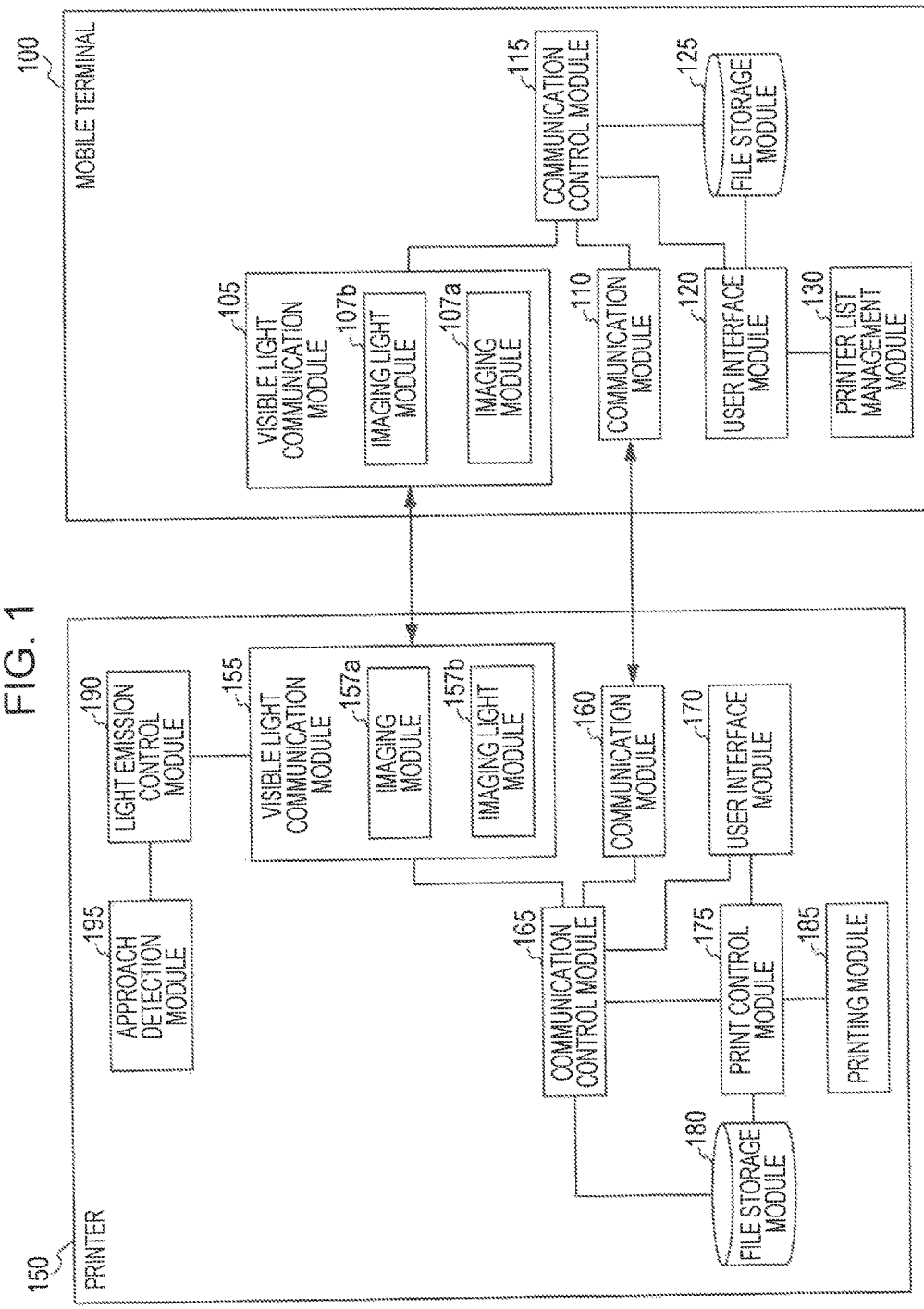
FIG. 1 is a conceptual module configuration diagram of an example configuration according to the exemplary embodiment.

FIG. 1 is a conceptual module configuration diagram of an example configuration according to this exemplary embodiment.

The term "module" generally refers to a logically separable component such as in software (computer program) or hardware. Thus, each module in this exemplary embodiment refers not only to a module in a computer program but also to a module in a hardware configuration. Accordingly, this exemplary embodiment is also directed to a computer program, for causing a computer to function as these modules (i.e., program for causing the computer to execute the respective procedures, a program for causing the computer to function as the respective units, or a program for causing the computer to implement the respective functions), as well as to a system and a method. While the expressions "store data" and "data is stored" and their equivalent expressions are used for convenience of description, such expressions have a meaning of making a storage device store data or controlling a storage device to store data if an exemplary embodiment is directed to a computer program. While each module may be given a single function, each module may be constituted by a single program or multiple modules may be constituted by a single program in actual implementation. Conversely, a single module may be constituted by multiple programs. In addition, multiple modules may be executed by a single computer, or a single module may be executed by multiple computers in a distributed or parallel environment. As an alternative, a single module may include another module. In the following, the term "connection" refers not only to a physical connection but also to a logical connection (such as exchanging of data, sending instructions, and a reference relationship between data). The term "predetermined" refers to a state in which certain information is determined before intended processing is to be performed, and is used to include not only a state in which such information is determined at a time point prior to the commencement of processing according to this exemplary embodiment but also a state in which the information is determined at a time point prior to intended processing even after the processing according to this exemplary embodiment has commenced, depending on the condition or the state at that time or depending on the condition or the state until that time. When there are multiple "predetermined values", the values may be different or two or more (or all) of the values may be identical. A description having a meaning of "if A, then B" is used to mean: "it is determined whether or not A, and B if it is determined that A" unless the determination of whether or not A is required.

Furthermore, the term "system", "apparatus", or "device" is used to include a configuration in which multiple computers, hardware components, apparatuses, devices, or other suitable elements are connected to each other via a communication medium such as a network (including one-to-one communication connections), and what is implemented by a single computer, hardware component, apparatus, device, or suitable element. The terms "apparatus", "device", and "system" are used synonymously. It is to be understood that the tern "system" does not include what is merely a social "mechanism" (social system), which is a kind of artificial arrangement.

Moreover, target information is read from a storage device for each processing operation that is to be performed by an individual module or, if multiple processing operations are to be performed within a module, for each of the multiple processing operations. After the processing is performed, the result of the processing is written to the storage device. Thus, the reading of information from the storage device before the processing of the information is to be performed and the writing of information to the storage device after the processing of the information has been performed are not described in some cases. Examples of the storage device used here may include a hard disk, a random access memory (RAM), an external storage medium; a storage device connected via a communication line, and a register within a central processing unit (CPU).

A system according to this exemplary embodiment is constituted by a mobile terminal 100 and a printer 150. The mobile terminal 100 is configured to provide a print instruction (also referred to as a "print job") to the printer 150. The printer 150 is configured to perform printing upon receipt of a print instruction from the mobile terminal 100. For example, in a setting in which a user temporarily uses the printer 150 (such as when the user uses the printer 150 one time in a location during a business trip), it may be bothersome for the user to set settings for establishing communication between the mobile terminal 100 and the printer 150. This exemplary embodiment eliminates the need for the user to perform a communication setting operation (at least an operation of selecting the printer 150, which is the destination of the print instruction) even in this case to send a print instruction from their mobile terminal 100 to thereby perform printing using the printer 150.

Visible light communication is used for communication between the mobile terminal 100 and the printer 150 (in Particular, communication from the printer 150 to the mobile terminal 100).

Visible light communication is a way of communication that uses visible light emitted from an illumination source such as a light emitting diode (LED) and modulated by changing the intensity of the visible light. The following are examples of standards for visible light communication.

JEITA CP-1221/1222/1223 (Japan Electronics and Information Technology Industries Association)

These standards are used principally for illumination light communication with 4.8 kbps each way.

JEITA CP-1221 Visible Light Communications System, March 2007 http://www.jeita.or.jp/japanese/standard/book/CP-1221

JEITA CP-1222 Visible Light ID System, June 2007 http://www.jeita.or.jp/japanese/standard/book/CP-1222

JEITA CP-1223 Visible Light Beacon System, May 2013 http://www.jeita.or.jp/japanese/standard/book/CP-1223

The standards listed above provide various applications, such as identifying an object, providing position information, and establishing various guidance systems, by causing a visible light source to transmit via radiation brief information or identification (ID) information specific to the visible light source.

ARIB STD-T50 Ver. 4.0 (Association of Radio Industries and Businesses), December 2009

This standard is a standard for optical local area network (LAN) (visible light extension of infrared light LAN) that uses visible light for downlink and infrared light for uplink.

http://www.arib.or.jp/english/html/overview/doc/1-STD-T50v4_0.pdf

IrDA "Visible Light Communication Standard" Ver. 1.0 (the joint cooperative agreement between the Visible Light Communications Consortium (VLCC) and the Infrared Data Association (IrDA)), February 2009

This standard is a standard that is an extension to and compatible with IrDA visible light communication technology.

Institute of Electrical and Electronics Engineers (IEEE) 802.15.7 (January 2009)

This standard is a visible light communication standard that has been released.

IEEE 802.15.SG7a

This standard is a visible light communication standard that uses image sensors.

The printer 150 emits light for visible light communication to the mobile terminal 100 and transmits to the mobile terminal 100 information (hereinafter referred to also as designation information for designating the printer 150 to establish communication with the printer 150. The term "communication" the phrase "to establish communication with the printer 150", as used herein, refers to communication that is not visible light communication and that requires designation information for designating a destination of the communication. Examples of the communication may include wireless communication such as that via WiFi (Wireless Fidelity) or Bluetooth (registered trademark), which is a standard for short-range wireless communication. The term "designation information for designating the printer 150" refers to information for designating the other end of communication (such as for pairing), and the information typically includes the name, address, etc. of the device, specific examples of which include an Internet protocol (IP) address, a Media Access Control (MAC) address, an email address, and a terminal name.

The mobile terminal 100 receives the designation information (i.e., information for designating the printer 150 to establish communication with the printer 150) from the printer 150 via visible light communication.

Then, the mobile terminal 100 performs the setting of communication (i.e., communication that is not visible light communication and that is set by using the designation information) in accordance with the designation information, and transmits a print instruction to the printer 150 by using the communication.

The printer 150 receives the print instruction from the mobile terminal 100 via the communication and performs printing in accordance with the print instruction.

The series of processes described above may not necessarily involve an operation of selecting the destination of the print instruction by using the mobile terminal 100.

As in the example illustrated in FIG. 1, the mobile terminal 100 includes a visible light communication module 105, a communication module 110, a communication control module 115, a user interface module 120, a file storage module 125, and a printer list management module 150. The mobile terminal 100 is typically also called a portable terminal, examples of which include mobile phones (including smartphones), notebook personal computers (PCs), and wearable terminals (e.g., wristwatch-type terminals, glasses-type terminals etc.). The mobile terminal 100 is capable of visible light communication. (at least visible light communication for transmission) and is designed to transmit a print instruction to the printer 150 in accordance with a user operation.

The visible light communication module. 105 includes an imaging module 107a and an imaging light module 107b and is connected to the communication control module 115. The visible light communication module 105 performs visible light communication (receives and emits light for visible light communication). The visible light communication module 105 may control the imaging module 107a and the imaging light module 107b to perform visible light communication. The visible light communication module 105 receives, via visible light communication, designation information for designating the printer 150 to establish communication with the printer 150. The designation information is passed to the communication control module 115.

The visible light communication module 105 may be disposed so as to be oriented in the same direction as that of a camera included it the mobile terminal 100. In this case, an image captured with the camera may be displayed on a display of the user interface module 120 to allow the user to check the destination of the visible light communication (i.e., the printer 150).

The imaging module 107a has a function as a device for receiving light for visible light communication. That is, the imaging module 107a receives information transmitted from the printer 150 via visible light communication. Specifically, the imaging module 107a corresponds to a light.-receiving unit of the camera.

The imaging light module 107b has a function as a device for emitting light for visible light communication. That is, the imaging light module 107b transmits information to the printer 150 via visible light communication. Specifically, the imaging light module 107b corresponds to an imaging light (such as a strobe light) of the camera. The imaging module 107a and the imaging light module 107b have functions as a light-receiving unit and an imaging light of the camera, respectively, and also have functions as a visible light communication device complying with a standard.

The communication module 110 is connected to the communication control module 115. The communication module 110 performs communication (communication other than visible light communication) with the printer 150. The communication module 110 is controlled by the communication control module 115 to transmit a print instruction to the printer 150 via communication in accordance with the designation information received by the visible light communication module 105.

The communication control module 115 is connected to the visible light communication module 105, the communication module 110, the user interface module 120, and the file storage module 125. The communication control module 115 causes the visible light communication module 105 to receive, via visible light communication, designation information for designating the printer 150 to establish communication with the printer 150. The communication control module 115 further controls the communication module 110 to transmit a print instruction to the printer 150 via communication in accordance with the designation information. Visible light communication makes the source (e.g., the printer 150), the destination (e.g., the mobile terminal 100), and a communication path visible to the user and hence allows the user to readily understand the communication range.

The communication control module 115 may control the communication module 110 to transmit a print instruction to the printer 150 without accepting an operation input of the user for selecting the printer 150, which is the destination of the print instruction.

The communication control module 115 may control the visible light communication module 105 to transmit an instruction for transmitting designation information for designating the printer 150. The term "instruction for transmitting designation information for designating the printer 150", as used here, refers to an instruction sent by the mobile terminal 100 to request designation information that is necessary to start communication with the printer 150.

The communication control module 115 may control the visible light communication module 105 to stop reception using visible light communication if "designation information for designating the printer 150" has been received. The reason for this is to stop further reception of "designation information for designating the printer 150".

If the visible light communication module 105 receives a characteristic or state of the printer 150 from the printer 150 via visible light communication, the communication control module 115 may generate a print instruction in accordance with the characteristic or state of the printer 150. Then, the communication control module 115 may control the communication module 110 to transmit the generated print instruction.

The communication control module 115 may control the communication module 110 to transmit "information indicating that communication is being performed in response to receipt, via visible light communication, of designation information for designating the printer 150" and a print instruction to the printer 150.

The user interface module 120 is connected to the communication control module 115, the file storage module 125, and the printer list management module 130. The user interface module 120 accepts a user operation made via a touch screen, audio, a line of sight, a gesture, a mouse, a keyboard, or the like. Examples of the user operation include sending a print instruction. The user interface module 120 informs the user of information by using a liquid crystal display, a speaker, a vibrator, or any other suitable device. The user interface module 120 may provide an indication if information indicating receipt of a print instruction has been received, from the printer 150. In response to the indication, the user performs an operation of interrupting visible light communication (such as stopping reception of light for the visible light communication or moving the mobile terminal 100 so that light for visible light communication impinges off a visible light sensor (light-receiving sensor) of the mobile terminal 100).

When "designation information for designating the printer 150" is being received via visible light communication, the user interface module 120 may provide a suggestion of an operation to be performed by the user, the operation including positioning the mobile terminal 100 so that visible light is applied to the mobile terminal 100 (or a suggestion of continuation of this operation). This allows the user to readily understand the operation to be performed to receive designation information for designating the printer 150 via visible light communication.

The file storage module 125 is connected to the communication control module 115 and the user interface module 120. The file storage module 125 stores a file to be printed. The communication control module 115 may create a print instruction that includes a file to be printed.

The printer list management module 130 is connected to the user interface module 120. The printer list management module 130 manages a selection list (printer list) for allowing the user to select the printer 150. The selection list includes the designation information (or the name or the like of the printer 150, which is extracted from the designation information, to help a person easily identify the printer 150), for example.

If the designation information is received by the visible light communication module 105, the printer list management module 130 does not add the received designation information to a selection list for selecting a printer as the destination of wireless communication.

If the designation information is received by the communication module 110, the printer list management module 130 may add the received designation information to the selection list. That is, designation information that is received via visible light communication may not be included in the selection list, and designation information that is received via wireless communication may be included in the selection list. The reason for this is as follows. Visible light communication is generally intended for temporary use. Thus, designation information obtained via visible light communication is not included in the selection list so that the visibility of the selection list is maintained, and may also be prevented from leaking. On the other hand, designation information that is received via wireless communication is generally intended for continuous use and is thus included in the selection list for future convenience.

As in the example illustrated in FIG. 1, the printer 150 includes a visible light communication module 155, a communication module 160, a communication control module 165, a user interface module 170, a print control module 175, a file storage module 180, a printing module 185, a light emission control module 190, and an approach detection module 195. The printer 150 may be typically a printer or a multifunction device having a printer function (an image processing device having two or more of the functions of a scanner, a printer, a copying machine, a facsimile machine, and other devices).

The visible light communication module 155 includes an imaging module 157*a* and an imaging light module 157*b* and is connected to the communication control module 165 and the light emission control module 190. The visible light communication module 155 performs visible light communication (receives and emits light for visible light communication) with the mobile terminal 100. The visible light communication module 155 may control the imaging module 157*a* and the imaging light module 157*b* to perform visible light communication. The visible light communication module 155 transmits designation information for designating the printer 150 to establish communication with the printer 150 to the mobile terminal 100 via visible light communication.

The imaging module 157*a* corresponds to an approach detection camera 320 or a face imaging camera 340, which are described below with reference to FIG. 3, for example.

The imaging light module 157*b* corresponds to an approach detection light 330 or a face imaging light 350, which are described below with reference to FIG. 3, for example.

The communication module 160 is connected to the communication control module 165. The communication module 160 performs communication (communication other than visible light communication) with the mobile terminal 100. The communication module 160 receives a print instruction from the mobile terminal 100 via the communication. The print instruction is passed to the communication control module 165.

The communication control module 165 is connected to the visible light communication module 155, the communication module 160, the user interface module 170, the print control module 175, and the file storage module 180. The communication control module 165 controls the visible light communication module 155 to transmit "designation information for designating the printer 150" to the mobile terminal 100 via visible light communication. The communication control module 165 receives a print instruction from the mobile terminal 100 via the communication module 160.

The communication control module 165 may transmit "designation information for designating the printer 150" multiple times. The reason for this is as follows. In some cases, reception via visible light communication may commence before the printer 150 receives the header portion of a print instruction. That is, in some cases, the printer 150 may start visible light communication before applying visible light to a visible light sensor of the mobile terminal 100.

When the printer 150 transmits "designation information for designating the printer 150" multiple times, the communication control module 115 of the mobile terminal 100 may determine whether or not the currently received designation information is identical to the previously received designation information, and may discard the currently received designation information if both pieces of designation information are identical.

The printer 150 may also include a human sensor that detects a presence of a person. When the human sensor detects a presence of a person, the communication control module 165 may control the visible light communication module 155 to start visible light communication. The term "detect a presence of a person", as used here, is used to include detecting a person approaching the printer 150. The human sensor may use infrared light, ultrasonic waves, visible light, or the like. A combination of them, for example, a combination of infrared light and ultrasonic waves, may be used or only infrared light or the like may be used.

When an instruction for transmitting designation information for designating the printer 150 is received from the mobile terminal 100 via visible light communication, the communication control module 165 may control the visible light communication module 155 so that the printer 150 starts visible light communication.

When the communication module 160 receives a print instruction, the communication control module 165 may control the visible light communication module 155 to stop emitting light for visible light communication. The reason for this is to stop further transmission of "designation information for designating the printer 150" The phrase "when the communication module 160 receives a print instruction", as used here, may be used to indicate when the reception of all pieces of data included in a print instruction is completed or the time point at which a print instruction is determined to have been received.

The communication control module 165 may further control the visible light communication module 155 to transmit a characteristic or state of the printer 150 via visible light communication. Examples of the characteristic of the printer 150 include an available sheet size, a resolution, the availability of color or monochrome printing, and the availability of simplex or duplex printing. Examples of the state of the printer 150 include a printer-ready state, a printer-error state, and a paper-out state.

Further, if "information indicating that communication is being performed in response to receipt, via visible light communication, of designation information for designating the printer 150" has been received together with a print instruction, the communication control module 165 may perform control to perform printing in accordance with the print instruction. The reason for this is to distinguish receipt of a print instruction after visible light communication has been performed-and receipt of a print instruction without visible light communication from each other. If no print instruction has been received, the communication control module 165 performs control to wait for a print instruction to be received.

The user interface module 170 is connected to the communication control module 165 and the print control module 175. The user interface module 170 accepts a user operation made via a touch screen, audio, a line of sight, a gesture, a mouse, a keyboard, or the like. Further, the user interface module 170 informs the user of information by using a liquid crystal display, a speaker, a vibrator, or any other suitable device.

The print control module 175 is connected to the communication control module 165, the user interface module 170, the file storage module 180, and the printing module 185. The print control module 175 causes the printing module 185 to perform a printing process in accordance with the print instruction received by the communication control module 165.

The file storage module 180 is connected to the communication control module 165 and the print control module 175. The file storage module 180 stores a file included in the print instruction received by the communication control module 165.

When transmission is to be performed via visible light communication, the user interface module 170 may provide a suggestion of an operation to be performed by the user, the operation including positioning the mobile terminal 100 so that visible light is applied to the mobile terminal 100. This allows the user to readily understand the operation to be performed to perform transmission via visible light communication.

The printing module 185 is connected to the print control module 175. The printing module 185 performs a printing process in accordance with control of the print control module 175.

The approach detection module 195 is connected to the light emission control module 190. The approach detection module 195 detects a presence of a person. The person to be detected here is a user who is to perform printing by using the printer 150 and who possesses the mobile terminal 100.

The light emission control module 190 is connected to the visible light communication module 155 and the approach detection module 195. When the approach detection module 195 detects a presence of a person, the light emission control module 190 controls the visible light communication module 155 to start transmission via visible light communication (light emission) with a low-power-consumption mode enabled. The printer 150 has the low-power-consumption mode and a print mode (also called a standby mode). In the low-power-consumption mode, the printer 150 is waiting for a print command. In the print mode, the printer 150 is ready for printing. The printer 150 has lower power consumption in the low-power-consumption mode than in the print mode. In the print mode, an image forming unit is preheated, and thereby the image forming unit is ready to execute printing or executes printing. The low-power-consumption mode may include modes for multiple steps. For example, the low-power-consumption mode includes a low-power mode in which the temperature of a heater unit is low and a motor is not in operation, an automatic turn-off mode (also called a sleep mode) in which the main power switch is turned off and which is the most power saving mode. The term "low-power-consumption mode enabled" refers to a state in a mode other than the print mode and may be either the low-power mode or the automatic turn-off mode, for example. Thus, a transition from the automatic turn-off mode to the low-power mode is also included in the state with the "low-power-consumption mode enabled". In the low-power-consumption mode, a display or the like may be turned off. In this exemplary embodiment, however, the display of items on the display or the like, as well as visible light communication, may be performed with the "low-power-consumption mode enabled". That is, the low-power-consumption mode may be a state in which a component or device other than the display or the like saves power. Accordingly, the low-power-consumption mode is not necessarily regarded as being canceled in response to only turning on of the display or the like.

The functions of the visible light communication module 155, the printer list management module 130, and so on will now be described.

The visible light communication module 155 transmits designation information for designating the printer 150 as the destination of wireless communication to the mobile terminal 100 via visible light communication by using the imaging light module 157b.

The communication module 160 receives a print instruction from the mobile terminal 100 via wireless communication in accordance with the designation information.

Further, the visible light communication module 155 transmits designation information for designating the printer 150 as the destination of wireless communication to the mobile terminal 100 via visible light communication with the low-power-consumption mode enabled.

The communication module 160 receives a print instruction from the mobile terminal 100 via wireless communication in accordance with the designation information.

Further, the visible light communication module 155 transmits designation information for designating the printer 150 as the destination of wireless communication via visible light communication.

The communication module 160 receives a print instruction from the mobile terminal 100 via wireless communication in accordance with the designation information.

The approach detection module 195 detects a presence of a person.

When the approach detection module 195 detects a presence of a person, the light emission control module 190 controls the visible light communication module 155 to start visible light communication with the low-power-consumption mode enabled. In this case, the imaging light module 157*b* may be used to perform transmission via visible light communication.

The imaging module 157*a* may be a detection imaging device for detecting an approach of a person or a face imaging device for capturing an image of the face of a person.

The imaging light module 157*b* may be disposed near the detection imaging device or the face imaging device.

The visible light communication module 155 transmits designation information for designating the printer 150 as the destination of wireless communication to a light-receiving unit of the mobile terminal 100 via visible light communication.

When the designation information is to be transmitted to the mobile terminal 100 via visible light communication, the user interface module 170 provides a suggestion of an operation to be performed by the user, the operation including positioning the mobile terminal 100 so that visible light is applied to the light-receiving unit of the mobile terminal 100.

The visible light communication module 105 receives the designation information for designating the printer 150 as the destination of wireless communication via visible light communication.

The communication module 110 receives the designation information via wireless communication.

When t the designation information is received by the visible light communication module 105, the printer list management module 130 does not add the received designation information to the selection list as a destination of wireless communication.

When the designation information is received by the communication module 110, the printer list management module 130 adds the received designation information to the selection list.

The wireless communication may include visible light communication or may be communication (specifically, WiFi, Bluetooth, etc.) different from visible light communication. The wireless communication may be limited to any communication.

FIGS. 2A and 2B1 through 2B4 illustrate an example configuration of a system that utilizes this exemplary embodiment, for example.

As in the example illustrated in FIG. 2A, visible light communication is performed between the mobile terminal 100 and the printer 150. For example, the mobile terminal 100 receives light for visible light communication from the printer 150 and receives "designation information for designating the printer 150". Then, the mobile terminal 100 sets the "designation information for designating the printer 150" to enable communication with the printer 150. As described above, the communication to be enabled here is communication other than visible light communication. The mobile terminal 100 transmits a print instruction to the printer 150 by using the communication. The printer 150 prints a file transmitted from the mobile terminal 100. The user removes a printed sheet from the printer 150.

The printer 150 is provided with a visible light communication device in an area thereof to which light can be applied from the outside (e.g., from the mobile terminal 100). Examples of the area include a front surface portion and a top surface portion of the printer 150.

In the example illustrated in FIG. 2A, the mobile terminal 100 and the printer 150 are away from each other. The mobile terminal 100 and the printer 150 may be in close proximity to each other if visible light communication is possible therebetween. For example, as illustrated in FIG. 2B1, a mobile terminal seat 220 for accommodating the mobile terminal 100 may be disposed in a top surface portion of the printer 150.

For example, as illustrated in FIG. 2B2, a visible light communication device 225 may be disposed on an upper side surface of the mobile terminal seat 220. Alternatively, a visible light communication device 230 may be disposed on a bottom surface of the mobile terminal seat 220. The visible light communication device 225 may be defined over the entirety of the upper side surface of the mobile terminal seat 220. The visible light communication device 230 may be defined over the entirety of the bottom surface of the mobile terminal seat 220. The visible light communication device 225 (the visible light communication device 230) may be defined on the upper side surface, the right side surface, the left side surface, the lower side surface, or the bottom surface or may be defined over the entirety thereof. The visible light communication device 225 (the visible light communication device 230) may be defined so as to match the position of a visible light communication device of the mobile terminal 100.

Alternatively, the visible light communication device 225 (the visible light communication device 230) may be defined on the entirety (the upper side surface, the lower side surface, the right side surface, the left side surface, and the bottom surface) of the mobile terminal seat 220 in order to support the mobile terminal 100 regardless of how the mobile terminal 100 is placed or what type the mobile terminal 100 is.

Figure 3:
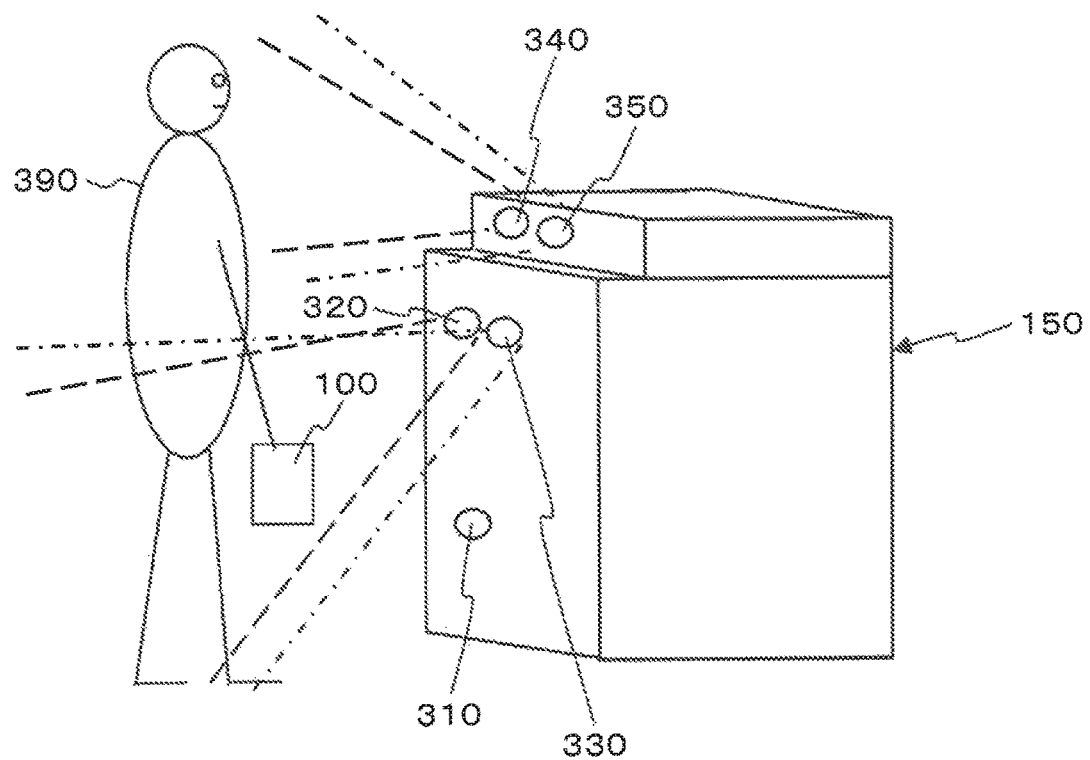
FIG. 3 illustrates a specific example of a printer according to the exemplary embodiment.
Figure 4:
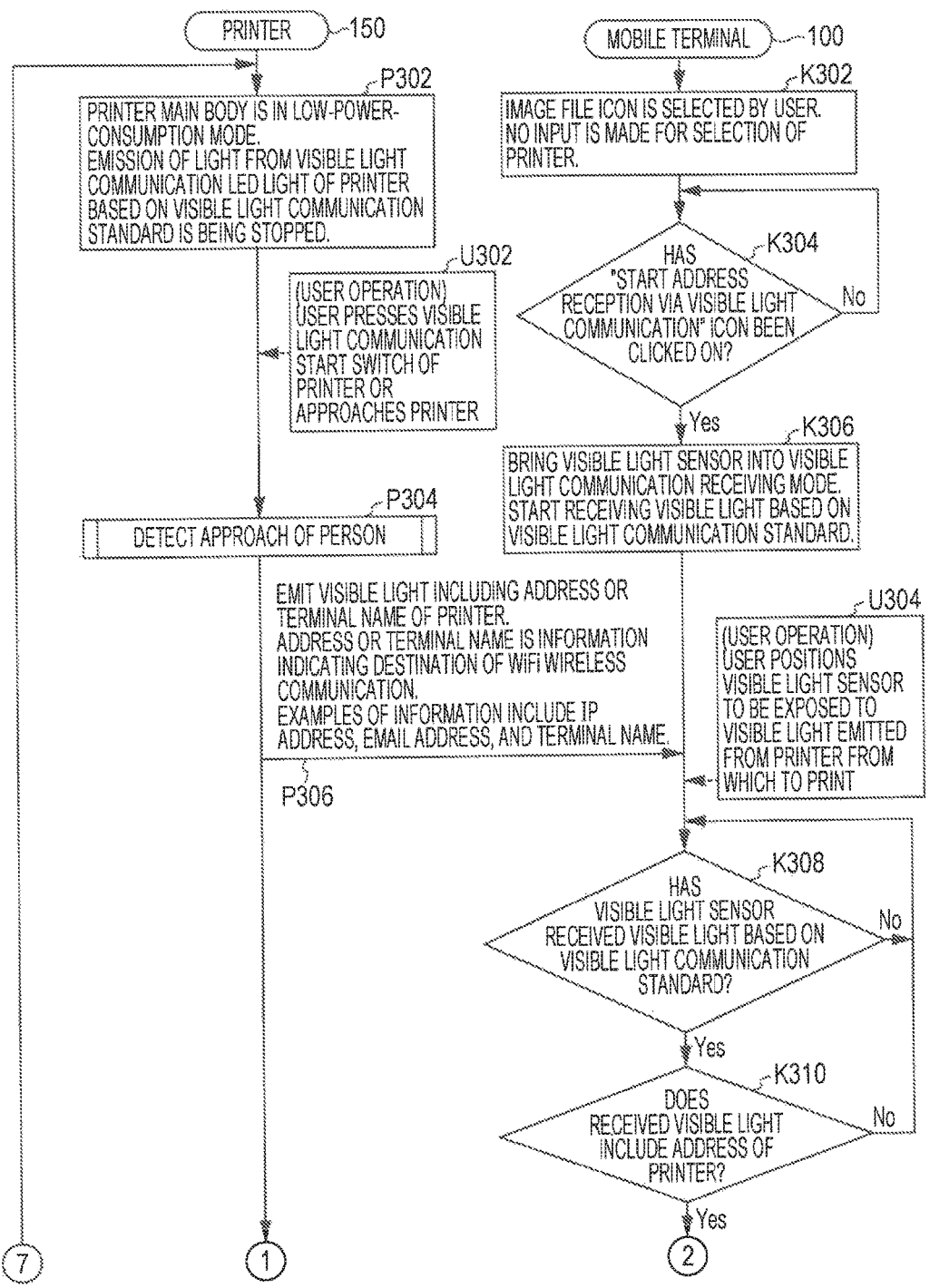

As in the example illustrated in FIG. 2B3, the mobile terminal 100 may include a visible light communication device 250 on a side surface of the mobile terminal 100. Alternatively, as in the example illustrated in FIG. 2B4, the mobile terminal 100 may include a visible light communication device 255 near a camera 260. In this case, as described above, an image of an entity at the other end of the visible light communication (i.e., the printer 150) is captured with the camera 260 and is displayed on a display of the mobile terminal 100, thereby allowing the user to check the entity at the other end of the communication. The camera 260 (the camera 260 having both the imaging function and the light emission function) may have the function of the visible light communication device 255 (a light-receiving sensor, a light-emitting device, or a combination of them). In this case, it is to be understood that the visible light communication device 255 in the example illustrated in FIG. 2B4 is no longer necessary and only the camera 260 (an example of the imaging module 107*a*) is required. Additionally, a strobe light (an example of the imaging light module 107*b*), the display, or any other suitable device, which are included in the mobile terminal 100, may be used as a light-emitting device for use in visible light communication.

FIG. 3 illustrates a specific example of the printer 150.

The printer 150 includes a presence detection sensor 310, an approach detection camera 320, an approach detection light 330, a face imaging camera 340, and a face imaging light 350. The approach detection camera 320 or the face imaging camera 340 is an example of the imaging module 157*a*, and the approach detection light 330 or the face imaging light 350 is an example of the imaging light module 157*b*. A visible light communication device is implemented as a combination of the approach detection camera 320 and the approach detection light 330 or a combination of the face imaging camera 340 and the face imaging light 350, thereby eliminating the need for a new visible light communication device to be disposed. As a result, cost is reduced. The Presence detection sensor 310 is an example of the approach detection module 195.

The broken lines define the imaging ranges (detection ranges) of cameras (the approach detection camera 320 and the face imaging camera 340). The one-dot chain lines define the illumination ranges of lights (the approach detection light 330 and the face imaging light 350). The approach detection camera 320 and the approach detection light 330 are positioned adjacent to each other. Likewise, the face imaging camera 340 and the face imaging light 350 are positioned adjacent to each other. The combination of the approach detection camera 320 and the approach detection light 330 is disposed at positions lower than those of the combination of the face imaging camera 340 and the face imaging light 350. This is because the face imaging camera 340 is used to capture an image of the face of a user 390.

Either the combination of the approach detection camera 320 and the approach detection light 330 or the combination of the face imaging camera 340 and the face imaging light 350 may be disposed or one of the combinations may also be used as the other combination. For example, the mobile terminal 100 may receive information from the approach detection light 330 via visible light communication and emit light (return a response) to the approach detection camera 320, or may receive information from the face imaging light 350 via visible light communication and emit light (return a response) to the face imaging camera 340.

When the printer 150 is provided with both the combination of the approach detection camera 320 and the approach detection light 330 and the combination of the face imaging camera 340 and the face imaging light 350, the visible light communication device may be implemented as either or both of the combination of the approach detection camera 320 and the approach detection light 330 and the combination of the face imaging camera 340 and the face imaging light 350. The use of both combinations provides a larger range for detecting the mobile terminal 100 than when either combination is used. When both combinations are used, light emissions may be synchronized. Reception of light at any light-receiving device (the approach detection camera 320 or the face imaging camera 340) may be supported. In this case, the mobile terminal 100 may receive information from the approach detection light 330 via visible light communication and emit light (return a response) to the face imaging camera 340 or may receive information from the face imaging light 350 via visible light communication and emit light (return a response) to the approach detection camera 320.

The approach detection camera 320 captures an image of a person to detect an approach of the person.

The face imaging camera 340 captures an image of the face of a person. The face imaging camera 340 may capture an image of the entire room in which the printer 150 is disposed.

The presence detection sensor 310 has a larger detection range than the approach detection camera 320 and is capable of detecting a more distant object. The presence detection sensor 310 has lower (smaller) power consumption than the approach detection camera 320 or the face imaging camera 340.

Figure 5:
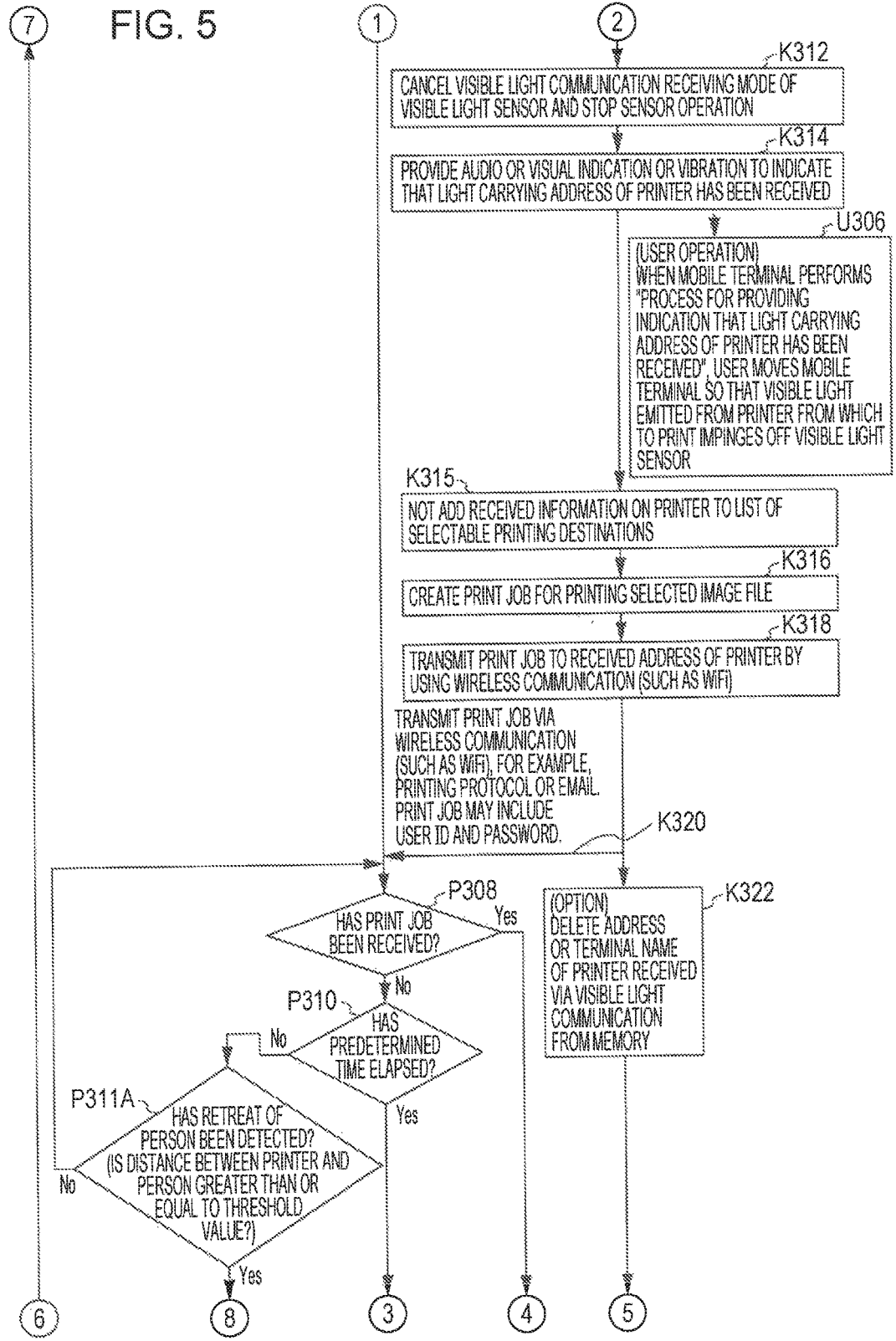
FIG. 5 is a flowchart illustrating the example process according to the exemplary embodiment.
Figure 6:
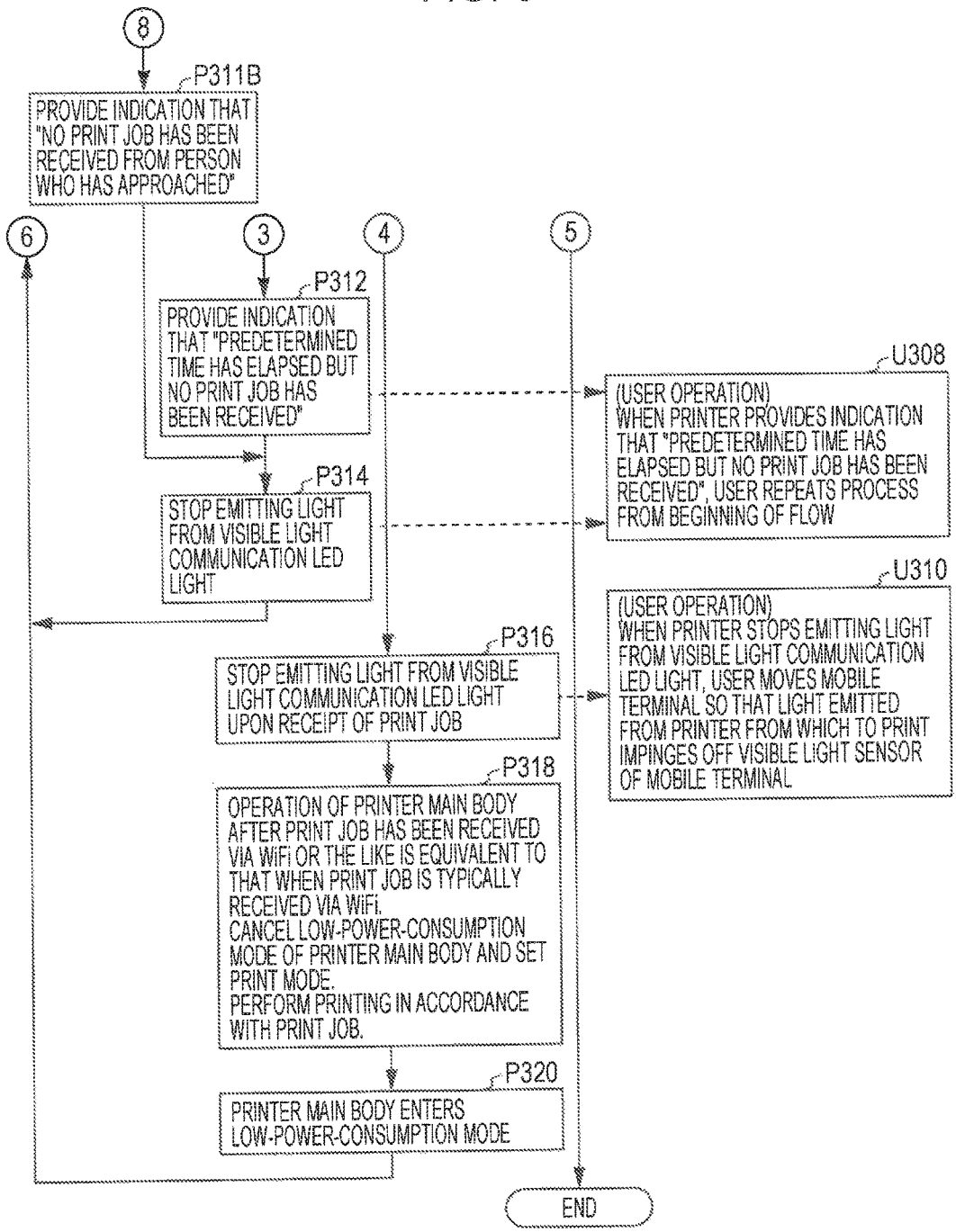
FIG. 6 is a flowchart illustrating the example process according to the exemplary embodiment.

FIGS. 4 to 6 are a flowchart illustrating an example process according to this exemplary embodiment. The process for the printer 150, the process for the mobile terminal 100, and the operation of the user 390 will be described by using steps P, K, and U, respectively.

The printer 150 performs the following process.

In step P302, the main body of the printer 150 is in the low-power-consumption mode. Emission of light from a visible light communication LED light of the printer 150, which is based on the visible light communication standard, is being stopped.

In step U302, as a user operation, the user presses a visible light communication start switch of the printer 150 or approaches the printer 150.

In step P304, the printer 150 detects an approach of a person. In step P304, the printer 150 may "detect pressing of the visible light communication start switch" instead of "detecting an approach of a person". The processing of step P304 will be described in detail below with reference to a flowchart illustrated in an example in FIG. 7 or 8.

In step P306, the printer 150 emits visible light including the address or terminal name of the printer 150 for communication from the printer 150 to the mobile terminal 100. The address or terminal name to be transmitted via visible light communication is an example of designation information indicating the destination of wireless communication (such as WiFi wireless communication) different from visible light communication. Examples of the designation information include the IP address, the email address, and the terminal name.

In step P308, the printer 150 determines whether or not a print job has been received. If a print job has been received, the process proceeds to step P316, or otherwise, the process proceeds to step P310. The term "receiving a print job" means "starting receiving a print job" or "completing receiving a print job".

In step P310, the printer 150 determines whether or not a predetermined time (e.g., five minutes) has elapsed, if the predetermined time has elapsed, the process proceeds to step P312, or otherwise, the process proceeds to step P311A. The "predetermined time" is the time taken after the address or the like has been transmitted in step P306.

In step P311A, the printer 150 determines whether or not a retreat of a person has been detected (whether or not the distance between the printer 150 and the person is greater than or equal to a threshold). If a retreat of a person has been detected, the process proceeds to step P311B, or otherwise, the process returns to step P308. If a face has been recognized, this determination may be performed in accordance with whether or not the person whose face has been recognized is the same as the person detected in step P304. Either of the determination processes of steps P310 and P311A may be performed first.

In step P311B, the printer 150 provides an indication that "no print job has been received from a person who has approached", and then the process proceeds to step P314.

In step P312, the printer 150 provides an indication that "the predetermined time has elapsed, but no print job has been received".

In step P314, the printer 150 stops emitting light from the visible light communication LED light. Then, the process returns to step P302.

In step U308, as a user operation, when the printer 150 provides an indication, that "the predetermined time has elapsed, but no print job has been received" (step P312 or P314), the user repeats the process from the beginning (such as step P302) of the flow.

In step P316, the printer 150 stops emitting light from the visible light communication LED light upon receipt of a print job. Once a print job is received, it is no longer necessary to emit light. Thus, the printer 150 stops emitting light to reduce power consumption. By stopping light emission, the user of the mobile terminal 100 is informed that the printer 150 has received a print job. Thus, if the mobile terminal 100 does not provide an "audio indication/visual indication/vibration to indicate that light carrying the address of the printer 150 has been received", the user understands that the user is allowed to move the visible light sensor so that visible light emitted from the printer 150 from which to print is not applied. An indication of the completion of reception may be displayed on a console panel different from that for the visible light communication LED light of the printer 150. However, stopping light emission from the visible light communication LED light may be more effective to improve user visibility and eliminates the need to display an indication on the console panel. Also in step P314, the printer 150 "stops emitting light". In step P314, the printer 150 stops emitting light "after the predetermined time has elapsed", whereas in step P316, the printer 150 stops emitting light "before the predetermined time elapses" (typically, immediately after an address or the like has been transmitted). These emissions of light are distinguishable by the user.

In step U310, as a user operation, when the printer 150 stops emitting light from the visible light communication LED light, the user moves the mobile terminal 100 so that light emitted from the printer 150 from which to print impinges off the visible light sensor of the mobile terminal 100.

In step P318, the operation of the main body of the printer 150 after a print job has been received via WiFi or the like is equivalent or substantially equivalent to that when a print job is typically received via WiFi. The low-power-consumption mode of the main body of the printer 150 is canceled and the print mode is set. The printer 150 performs printing in accordance with the print job.

In step P320, after the printing has been completed, the main body of the printer 150 enters the low-power-consumption mode. Then, the process returns to step P302.

On the other hand, the mobile terminal 100 performs the following operation.

In step K302, an image file icon is selected by the user. No input is made for the selection of a printer.

In step K304, the mobile terminal 100 determines whether or not a "Start address reception via visible light communication" icon has been clicked on. If the "Start address reception via visible light communication" icon has been clicked on, the process proceeds to step K306, or otherwise, the mobile terminal 100 waits for the "Start address reception via visible light communication" icon to be clicked on.

In step K306, the mobile terminal 100 brings the visible light sensor into a visible light communication receiving mode. The mobile terminal 100 starts visible light based on the visible light communication standard.

In step U304, as a user operation, the user positions the visible light sensor of the mobile terminal 100 to be exposed to visible light emitted from the printer 150 from which to print.

In step K308, the mobile terminal 100 determines whether or not the visible light sensor has received visible light based on the visible light communication standard. If visible light based on the visible light communication standard has been received, the process proceeds to step K310, or otherwise, the mobile terminal 100 waits for visible light based on the visible light communication standard to be received.

In step K310, the mobile terminal 100 determines whether or not the received visible light includes the address of the printer 150. If the visible light includes the address of the printer 150, the process proceeds to step K312, or otherwise, the process returns to step K308.

In step K312, the mobile terminal 100 cancels the visible light communication receiving mode of the visible light sensor and stops the operation of the visible light sensor.

In step K314, the mobile terminal 100 produces an audio or visual indication, a vibration, or the like to indicate that light carrying the address of the printer 150 has been received.

In step U306, as a user operation, when the mobile terminal 100 performs a "process for providing an indication that light carrying the address of the printer 150 has been received", the user moves the mobile terminal 100 so that visible light emitted from the printer 150 from which to print impinges off the visible light sensor of the mobile terminal 100.

The operation of step K314 may not necessarily be performed. The operation of step K314 allows the user to understand that the reception of light carrying the address of the printer 150 has been completed. Thus, the user learns the timing when to move the mobile terminal 100 so that visible light emitted from the printer 150 impinges off the mobile terminal 100.

In step K315, the printer list management module 130 does not add the received information (designation information) concerning the printer 150 to a list of selectable printing destinations. Traditionally, the name of the printer 150 is registered to the list of selectable printing destinations when the address or name of the printer 150 is received via wireless communication such as WiFi. When the user desires to perform printing, the user selects a desired printer 150 from the list of selectable printing destinations. Such a traditional method of registering the name of the printer 150 to the list of selectable printing destinations increases the number of entries in the list of selectable printing destinations and makes it difficult to select the destination printer 150 from the list of selectable printing destinations. In this exemplary embodiment, the received designation information on the printer 150 is not added to the list of selectable printing destinations, which makes it easier to select the destination printer 150 and is easier to use.

In step K316, the mobile terminal 100 creates a print job for printing the image file selected by the user.

In step K318, the mobile terminal 100 transmits the print lob to the received address of the printer 150 by using wireless communication (such as WiFi). The mobile terminal 100 may transmit the print job by using communication other than WiFi. For example, Bluetooth or the like may be used.

In step K320, the mobile terminal 100 transmits the print job to the printer 150. Here, the print job is transmitted via wireless communication (such as WiFi). For example, the print job may be transmitted in accordance with a printing protocol or via email. The print job may include a user ID and a password as additional information.

In step K322, the mobile terminal 100 deletes the address or terminal name of the printer 150, which has been received via visible light communication, from a memory. The operation of step K322 is optional.

When this exemplary embodiment is not used (when communication via only WiFi is used as in the related art), the address of the printer 150, which is the destination of the print job, needs to be set in the mobile terminal 100. In some cases, the setting operation is difficult for a user. For this reason, the address of the printer 150, which has been set once, is stored in a non-volatile memory and is reused for the next transmission of a print job.

In this exemplary embodiment, it is easy to receive the address of the destination printer 150 via visible light communication. This eliminates the need to store and reuse the address of the printer 150, which has been received once. The deletion of the address of the printer 150 prevents an unnecessary printer name from being stored in a printer selection list in the mobile terminal 100, which may lead to increased user visibility and may prevent leakage of designation information concerning the printer 150 (increase security).

In step K322, the address or terminal name of the printer 150 is deleted from the memory of the mobile terminal 100. However, a print record (or log), such as the date and time when an the location (with the use of global positioning system (GPS) in the mobile terminal 100) where a print instruction was made, the number of printed pages, the sheet size, and color or monochrome printing, is stored. Such a record is used for confirmation of the print fee when charged later.

Figure 7:
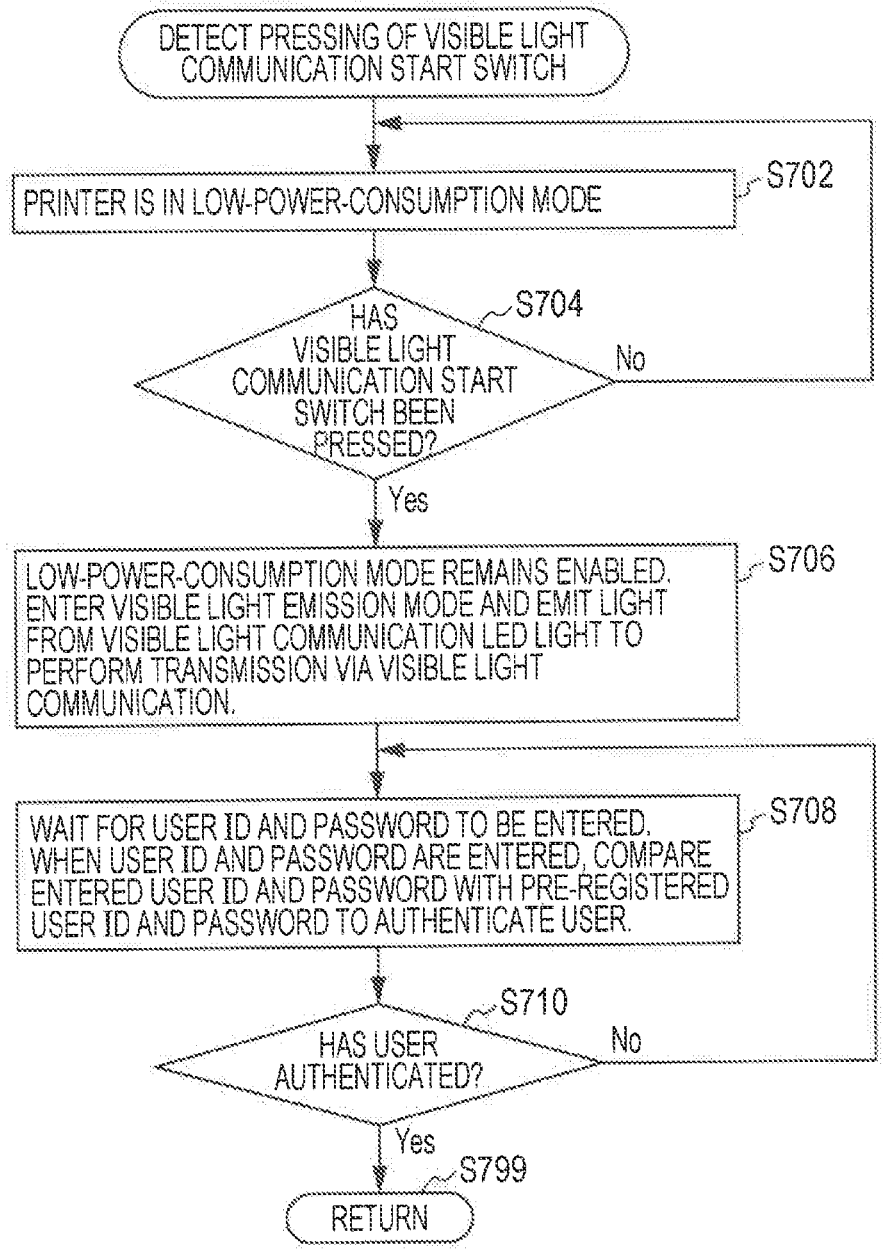
FIG. 7 is a flowchart illustrating an example process according to the exemplary embodiment.

FIG. 7 is a flowchart illustrating an example process according to this exemplary embodiment. The illustrated process is a first detailed example of step P304 in the flowchart illustrated by way of example in FIG. 4 and is a process performed in response to detection of pressing of the visible light communication start switch of the printer 150.

In step S702, the printer 150 is in the low-power-consumption mode.

In step S704, the printer 150 determines whether or not the visible light communication start switch has been pressed. If the visible light communication start switch has been pressed, the process proceeds to step S706, or otherwise, the process returns to step S702, In step S706, the low-power-consumption mode remains enabled. The printer 150 enters a visible light emission mode and emits light from the visible light communication LED light to perform transmission via visible light communication.

In step S708, the printer 150 waits for a user ID and a password to be entered. When a user ID and a password are entered, the printer 150 compares the entered user ID and password with a pre-registered user ID and password to authenticate the user, In step S710, the printer 150 determines whether or not the user has successfully been authenticated. If the authentication is successful, the process returns to step P304 (step S799), or otherwise, the process returns to step S708.

Figure 8:
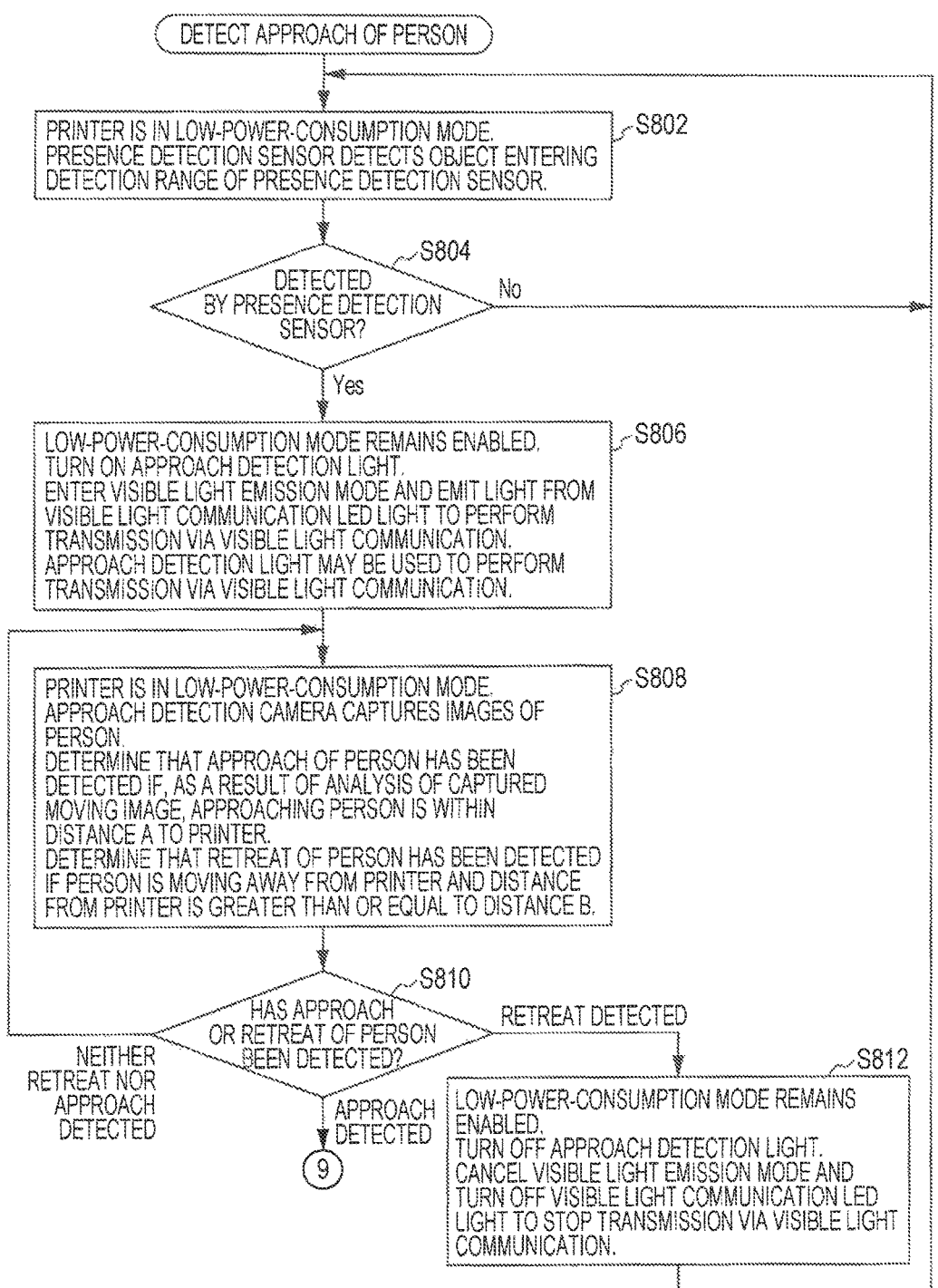
FIG. 8 is a flowchart illustrating an example process according to the exemplary embodiment.
Figure 9:
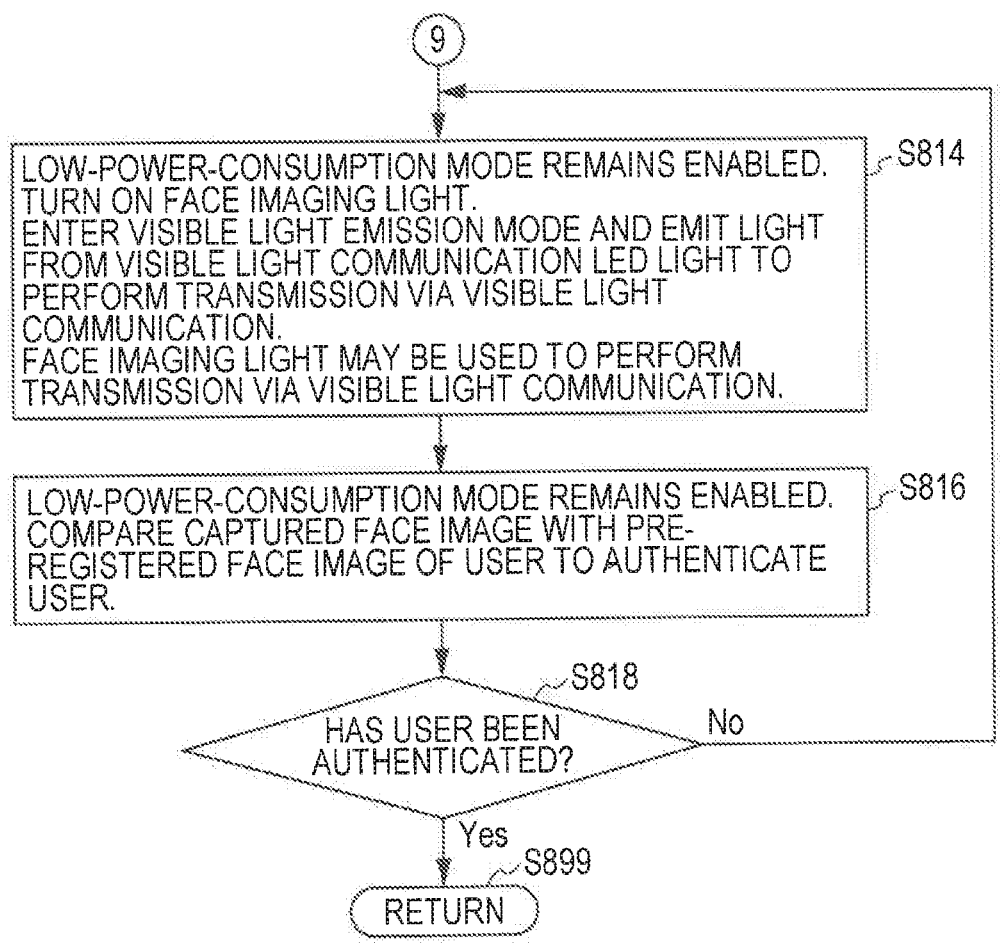
FIG. 9 is a flowchart illustrating the example process according to the exemplary embodiment.

FIGS. 8 and 9 are a flowchart illustrating an example process according to this exemplary embodiment. The illustrated process is a second detailed example of step P304 in the flowchart illustrated by way of example in FIG. 4 and is a process performed when the printer 150 detects an approach of a person.

In step S802, the printer 150 is in the low-power-consumption mode. The presence detection sensor 310 detects an object (including a person) entering the detection range of the presence detection sensor 310.

In step S804, the printer 150 determines whether or not the presence detection sensor 310 has detected any object. If an object has been detected, the process proceeds to step S806, or otherwise, the process returns to step S802.

In step S806, the low-power-consumption mode of the printer 150 remains enabled. The approach detection light 330 is turned on. The printer 150 enters the visible light emission mode and emits light from the visible light communication LED light to perform transmission via visible light communication. In this case, the approach detection light 330 may be used to perform transmission via visible light communication.

The reason why the printer 150 enters the visible light emission mode with the low-power-consumption mode enabled is as follows.

The user may not always transmit a print job to the printer 150 immediately after the printer 150 has emitted visible light in the visible light emission mode. In some cases, the user does not transmit a print job, or time is taken until a print job is transmitted. In such cases, if the visible light emission mode without the low-power-consumption mode enabled is followed by the print mode, the print mode remains enabled with unnecessary consumption of power. As a result, power consumption increases. The printer 150 enters the visible light emission mode with the low-power-consumption mode enabled, which may lead to a reduction in power consumption.

In step S808, the printer 150 is in the low-power-consumption mode. The approach detection camera 320 captures images of a person. As a result of analysis of a captured moving image, if an approaching person is within a distance A to the printer 150, the printer 150 determines that an approach of a person has been detected. If a person is moving away from the printer 150 and the distance from the printer 150 is equal to or greater than a distance B, the printer 150 determines that a retreat of a person has been detected.

The distance A for detecting an approach of a person and the distance B for detecting a retreat of a person may be the same or different. It is desirable that the distance B, which serves as a threshold, be longer than the distance A. This ensures that reception of visible light communication and transmission of a print job are performed even in a case where, for example, after the printer 150 has emitted visible light in response to a user approaching the printer 150, the user receives visible light or transmits a print job at a different position (for example, at a position that is a step back or at a position just in front of a visible light emitting unit or a visible light receiving unit), particularly in a case where the user has moved to a position that is further away from the printer 150.

After the detection of a presence of a person, the distance for detecting a presence of a person may he changed. For example, a distance D after detection may be longer than a distance C before detection. This ensures that a print instruction is provided even when another person who has seen a certain person sending a print instruction via visible light communication sends a print instruction at a distant position. The distance D may be used within a predetermined period after a print instruction was provided for the first time and thereafter the distance C may be used again. If another print instruction is provided during this period, the period may be initialized. That is, it multiple print instructions have been provided during this period, the distance P may be used within a predetermined period after the last print instruction has been provided, and thereafter the distance C may he used again.

In the foregoing description, distances (the distance A, the distance B, the distance C, and the distance D) are used as thresholds. Alternatively, the sensitivity of a sensor may be used as a threshold. For example, the sensitivity of a sensor may be set so that a presence of a distant person is detectable, or the sensitivity of a sensor may be set so that only a nearby person is detectable.

In step S810, the printer 150 determines whether or not an approach or retreat of a person has been detected. If neither retreat nor approach has been detected, the process returns to step S808. If a retreat has been detected, the process proceeds to step S812. If an approach has been detected, the process proceeds to step 3814.

In step S812, the low-power-consumption mode remains enabled. The approach detection light 330 is turned off. The printer 150 cancels the visible light emission mode and turns off the visible light communication LED light to stop transmission via visible light communication.

In step S814, the low-power-consumption mode remains enabled. The face imaging light 350 is turned on. The printer 150 enters the visible light emission mode and emits light from the visible light communication LED light to perform transmission via visible light communication. The face imaging light 350 may be used to perform transmission via visible light communication.

In step S816, the low-power-consumption mode remains enabled. The printer 150 compares a captured face image of the user with a pre-registered face image of a user to authenticate the user.

In step S818, the printer 150 determines whether or not the user has successfully been authenticated. If the authentication is successful, the process returns to step P304 (step S899), or otherwise, the process returns to step S814.

Figure 10:
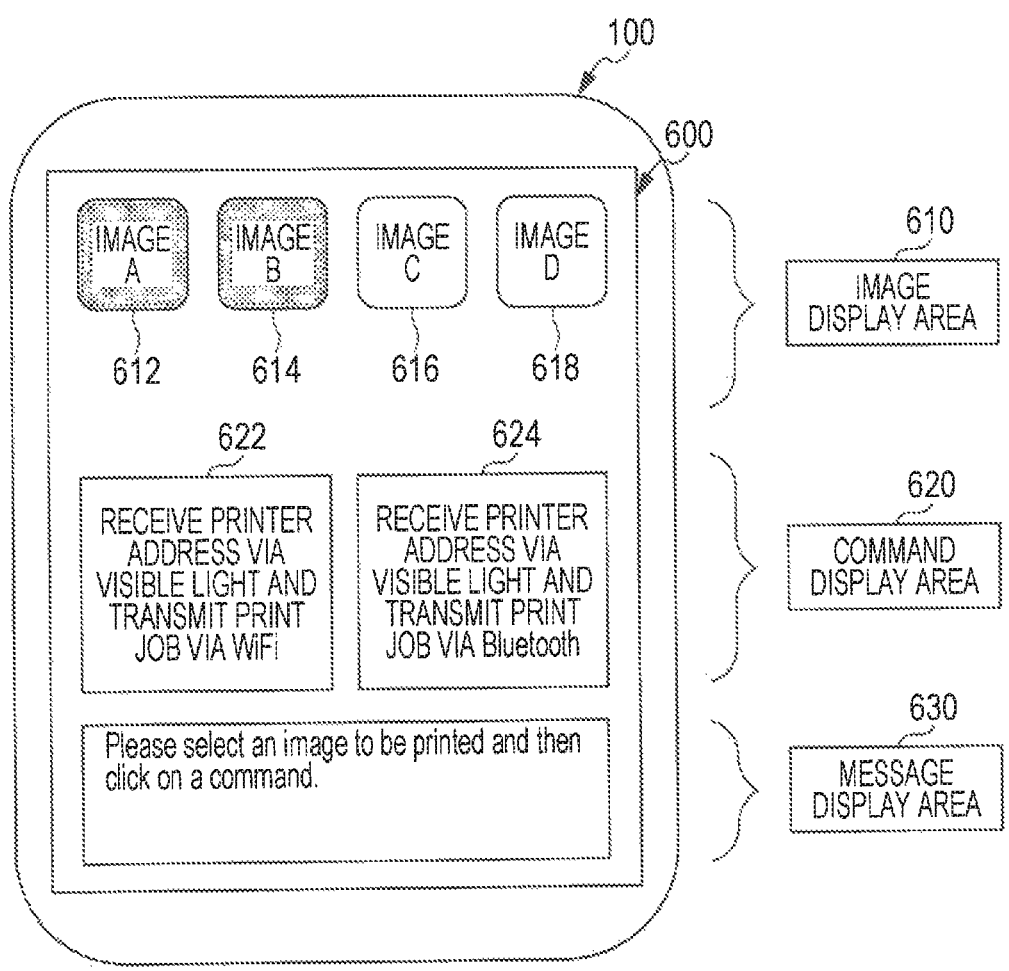
FIG. 10 illustrates an example process according to the exemplary embodiment.

FIG. 10 illustrates an example process (performed by the mobile terminal 100) according to this exemplary embodiment. Specifically, an example display in steps K302 and K304 in the flowchart is illustrated.

The mobile terminal 100 includes a display 600. In the exam illustrated in FIG. 10, the content displayed on the display 600 is illustrated.

The display 600 has three areas, namely, an image display area 610, a command display area 620, and a message display area 630.

The image display area 610 shows an "image A" icon 612, an "image B" icon 614, an "image C" icon 616, and an "image D" icon 618.

The command display area 620 shows a "Receive printer address via visible light and transmit print job via WiFi" icon 622 and a "Receive printer address via visible light and transmit print job via Bluetooth" icon 624.

The message display area 630 shows a message. The message display area 630 shows, for example, the message "Please select an image to be printed and then click on a command".

The example in FIG. 10 demonstrates that the "image A" icon 612 and the "image B" icon 614 have been selected. Thereafter, when either the "Receive printer address via visible light and transmit print job via WiFi" icon 622 or the "Receive printer address via visible light and transmit print job via Bluetooth" icon 624 is clicked on, the "Yes" route is taken for step K304 in the flowchart.

Figure 11:
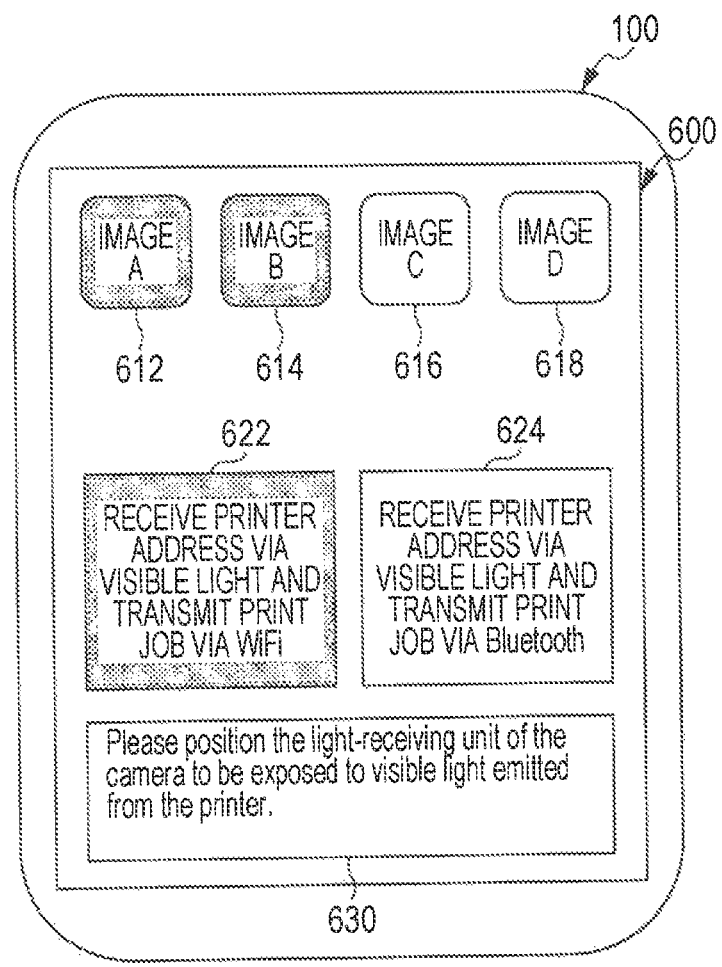
FIG. 11 illustrates an example process according to the exemplary embodiment.

FIG. 11 illustrates an example process (performed by the mobile terminal 100) according to this exemplary embodiment. Specifically, an example display in steps K306 and U304 in the flowchart is illustrated.

The "Receive printer address via visible light and transmit print job via WiFi" icon 622 is being selected by user selection.

The message display area 630 shows, for example, the message "Please position the light-receiving unit of the camera to be exposed to visible light emitted from the printer". The display of this message allows the user to readily understand the operation to be performed (specifically, the operation of positioning the light-receiving unit of the camera to be exposed to light emitted from the printer 150). Here, the "light-receiving unit of the camera" refers to the visible light sensor. The user performs an operation of positioning the visible light sensor to be exposed to visible light emitted from the printer 150 from which to print.

Figure 12:
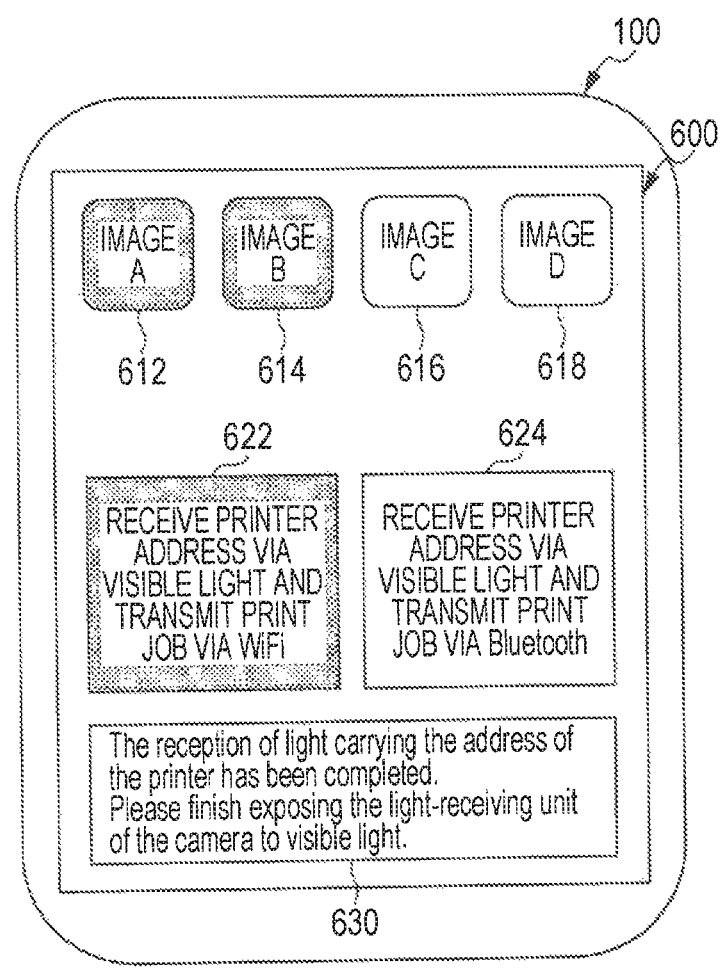
FIG. 12 illustrates an example process according to the exemplary embodiment.

FIG. 12 illustrates an example process (performed by the mobile terminal 100) according to this exemplary embodiment. Specifically, an example display in steps K308 to K314 and U306 in the flowchart is illustrated.

The "Receive printer address via visible light and transmit print job via WiFi" icon 622 is being selected by user selection.

The message display area 630 shows, for example, the message "The reception of light carrying the address of the printer has been completed. Please finish exposing the light-receiving unit of the camera to visible light". Here, the "light-receiving unit of the camera" refers to the visible light sensor.

When the reception of light carrying the address of the printer 150 is completed, a message describing the operation to be performed by the user is displayed in the message display area 630. The display of the message allows the user to readily understand the operation to be performed.

Figure 13:
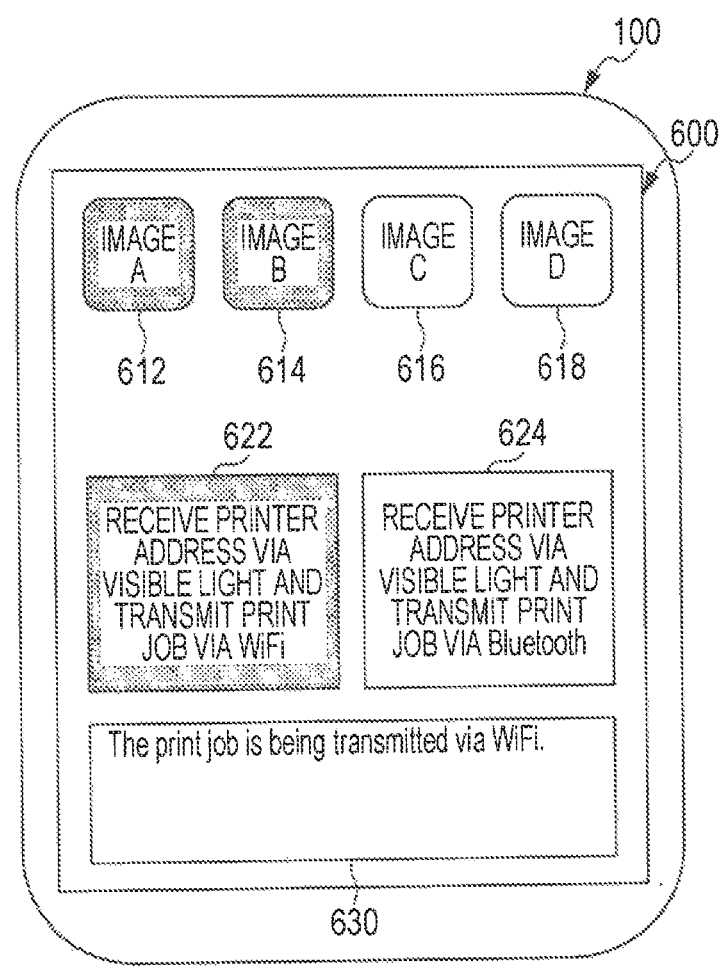
FIG. 13 illustrates an example process according to the exemplary embodiment.

FIG. 13 illustrates an example process (performed by the mobile terminal 100) according to this exemplary embodiment. Specifically, an example display in steps K316 and K318 in the flowchart is illustrated.

The "Receive printer address via visible light and transmit print job via WiFi" icon 622 is being selected by user selection.

The message display area 630 shows, for example, the message "The print job is being transmitted via WiFi".

In the steps described above, the print job is transmitted to the received address of the printer 150 by using wireless communication (such as WiFi). If the "Receive printer address via visible light and transmit print job via Bluetooth" icon 624 is selected, the message "The print job is being transmitted via Bluetooth" is displayed.

Figure 14:
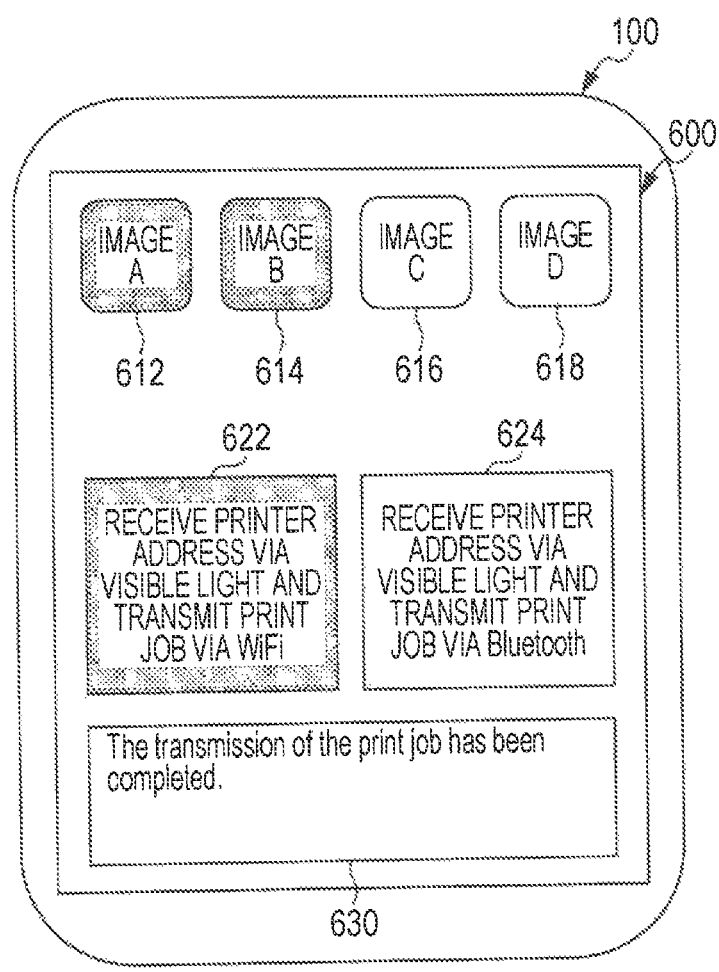
FIG. 14 illustrates an example process according to the exemplary embodiment.

FIG. 14 illustrates an example process (performed by the mobile terminal 100) according to this exemplary embodiment. Specifically, an example display in step K322 in the flowchart is illustrated.

The "Receive printer address via visible light and transmit print job via WiFi" icon 622 is being selected by user selection.

The message display area 630 shows, for example, the message "The transmission of the print job has been completed". The user is only required to wait for a printout to be produced by the printer 150.

Figure 15:
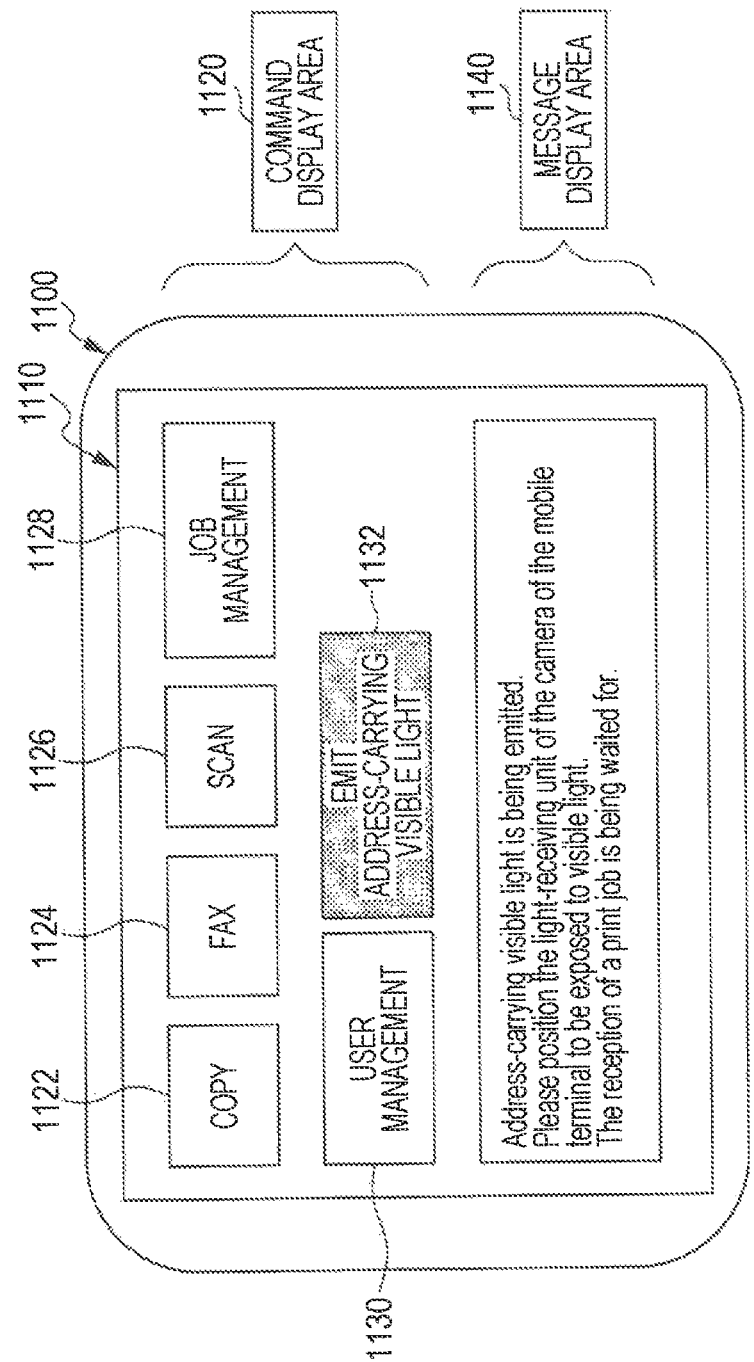
FIG. 15 illustrates an example process according to the exemplary embodiment.

FIG. 15 illustrates an example process (performed by the printer 150) according to this exemplary embodiment. Specifically, an example display in steps U302 and P304 in the flowchart is illustrated.

A display device 1100 includes a display 1110.

The display 1110 has a command display area 1120 and a message display area 1140.

The command display area 1120 shows a "copy" icon 1122, a "fax" icon 1124, a "scan" icon 1126, a "job management" icon 1128, a "user management" icon 1130, and an "Emit address-carrying visible light" icon 1132.

The message display area 1140 shows a message.

The "Emit address-carrying visible light" icon 1132 is being selected by user selection.

The message display area 1140 shows, for example, the message "Address-carrying visible light is being emitted. Please position the light-receiving unit of the camera of the mobile terminal to be exposed to visible light. The reception of a print job is being waited for".

In the example illustrated in FIG. 15, a screen displayed after a visible light communication start icon (corresponding to the "Emit address-carrying visible light" icon 1132) has been selected is illustrated when the printer 150 has this icon.

In the example in FIG. 15, the printer 150 is emitting light based on the visible light communication standard. A message describing the operation to be performed by the user is displayed in the message display area 1140. The display of the message allows the user to readily understand the operation to be performed (specifically, the operation of positioning the light-receiving unit of the camera to be exposed to light emitted from the printer 150).

Figure 16:
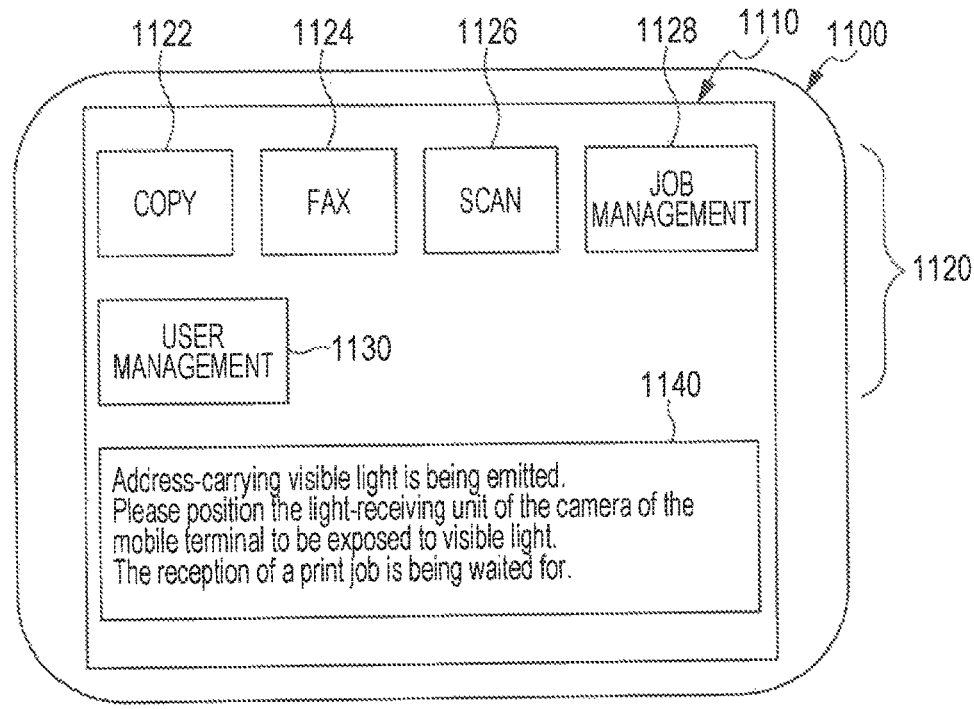
FIG. 16 illustrates an example process according to the exemplary embodiment.

FIG. 16 illustrates an example process (performed by the printer 150) according to this exemplary embodiment. Specifically, an example display in steps U302, P304, and P306 in the flowchart is illustrated. That is, an example display is illustrated which is provided in a case where the "Emit address-carrying visible light" icon 1132 is not displayed and in a case where, upon detection of an approach of a person, the mobile terminal 100 emits light including an instruction for emitting light carrying the address and the printer 150 receives the emitted light.

The command display area 1120 shows the "copy" icon 1122, the "fax" icon 1124, the "scan" icon 1126, the "job management" icon 1128, and the "user management" icon 1130.

The message display area 1140 shows, for example, the message "Address-carrying visible light is being emitted. Please position the light-receiving unit of the camera of the mobile terminal to be exposed to visible light. The reception of a print job is being waited for".

The "Emit address-carrying visible light" icon 1132 is not displayed when it is not necessary to instruct the printer 150 to start visible light communication or when the printer 150 constantly emits light. When the printer 150 is emitting light based on the visible light communication standard, a message describing the operation to be performed by the user is displayed in the message display area 1140. The display of the message allows the user to readily understand the operation to be performed.

Figure 17:
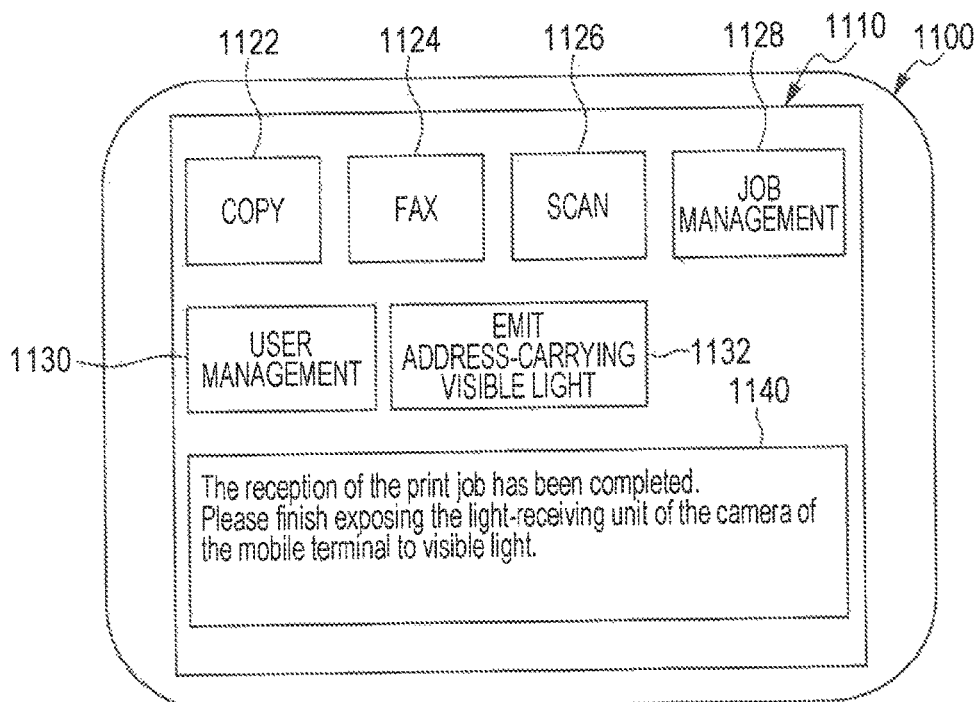
FIG. 17 illustrates an example process according to the exemplary embodiment.

FIG. 17 illustrates an example process (performed by the printer 150) according to this exemplary embodiment. Specifically, an example display in step P316 in the flowchart is illustrated.

The message display area 1140 shows, for example, the message "The reception of the print job has been completed. Please finish exposing the light-receiving unit of the camera of the mobile terminal to visible light".

When the reception of a print job is completed, the visible light communication LED light stops emitting light.

If the "Emit address-carrying visible light" icon 1132 is displayed, the state of the "Emit address-carrying visible light" icon 1132 is changed from the selected state to the original state (i.e., the unselected state).

A message describing the operation to be performed by the user is displayed in the message display area 1140. The display of the message allows the user to readily understand the operation to be performed.

Figure 18:
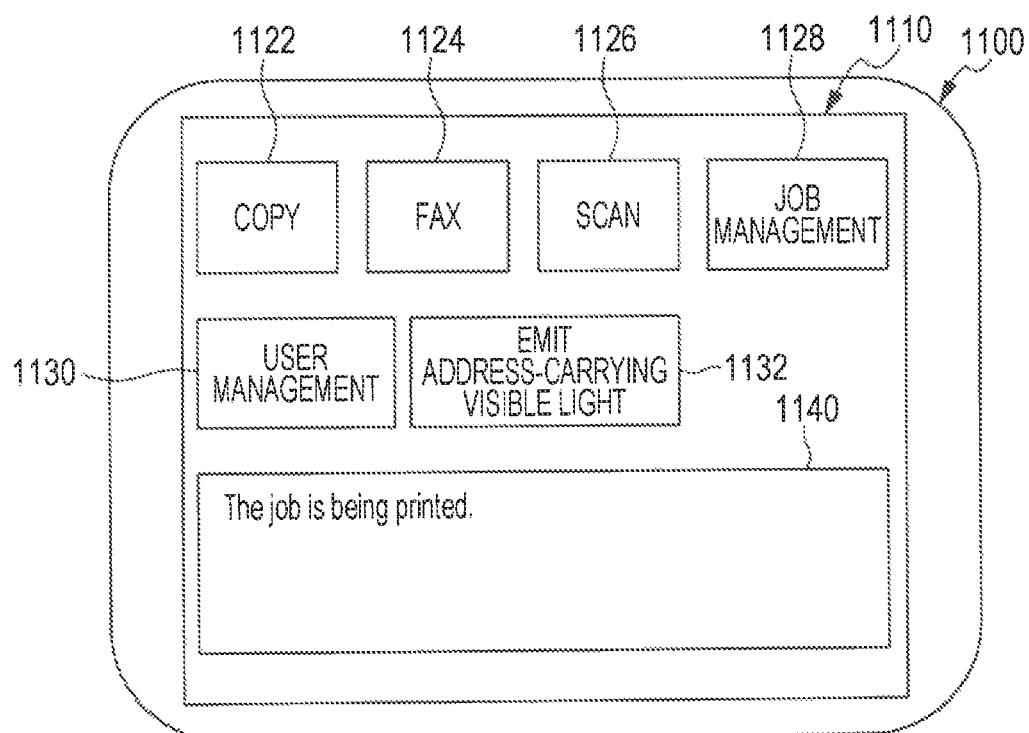
FIG. 18 illustrates an example process according to the exemplary embodiment.

FIG. 18 illustrates an example process (performed by the printer 150) according to this exemplary embodiment. Specifically, an example display in step P318 in the flowchart is illustrated.

The message display area 1140 shows, for example, the message "The job is being printed". This message indicates that printing is in progress in accordance with the print job. When the printing of the print job is completed, the message "The printing of the job has been completed" is displayed.

Figure 19:
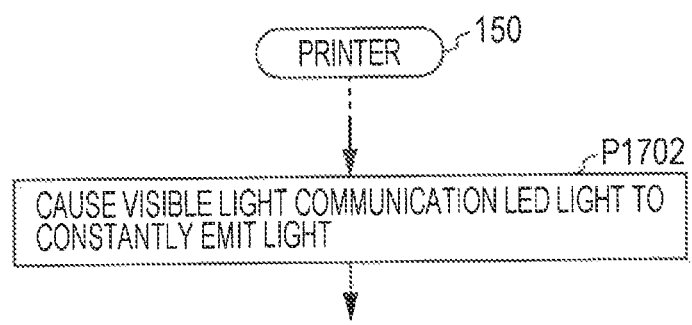
FIG. 19 is a flowchart illustrating an example process according to the exemplary embodiment.

FIG. 19 is a flowchart illustrating an example process according to this exemplary embodiment.

Steps P302 and P304 in the flowchart illustrated by way of example in FIG. 4 may be replaced with step P1702 illustrated by way of example in FIG. 19.

In step P1702, the printer 150 causes the visible light communication LED light to constantly emit light. The visible light includes the address or terminal name of the printer 150. The printer 150 may cause the visible light communication LED light to emit light with the low-power-consumption mode enabled.

This operation eliminates the need for a person to perform a switching operation, eliminates the need for a person to approach the printer 150 to transmit a print job, or eliminates the need for the mobile terminal 100 to perform a visible light emission process including providing an instruction to emit light carrying the address. Although the printer 150 have greater power consumption than that in steps P302 and P304 or the like, such power consumption is acceptable.

Figure 20:
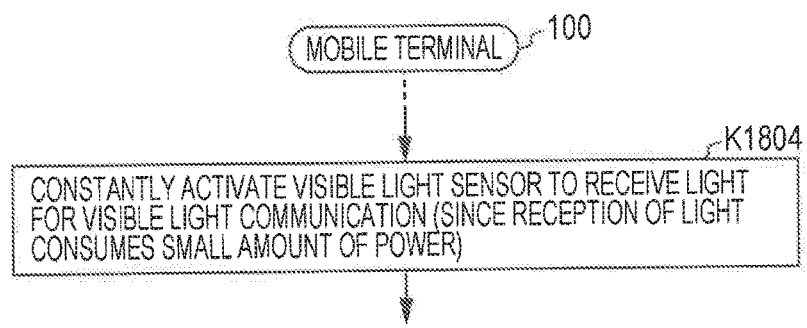
FIG. 20 is a flowchart illustrating an example process according to the exemplary embodiment.

FIG. 20 is a flowchart illustrating an example process according to this exemplary embodiment.

Steps K304 and K306 in the flowchart illustrated by way of example in FIG. 4 may be replaced with step K1804 illustrated by way of example in FIG. 20.

Steps K304 and K306 are process flow steps for starting receiving visible light after the "Start address reception via visible light communication" icon has been clicked on.

In step K1804, in contrast, the visible light sensor is constantly activated to receive light for visible light communication. This is because reception of light consumes less power than emission of light. This operation eliminates the need to wait for the "Start address reception via visible light communication" icon (specifically, the "Receive printer address via visible light and transmit print job via WiFi" icon 622 or the "Receive printer address via visible light and transmit print job via Bluetooth" icon 624 illustrated by way of example in FIG. 10, etc.) to be clicked on. That is, the user is no longer required to Perform an operation of "clicking on" the "Start address reception via visible light communication" icon. The user is only required to select an image file icon and to receive visible light emitted from the printer 150 by using the mobile terminal 100 to print the selected image file.

Figure 21:
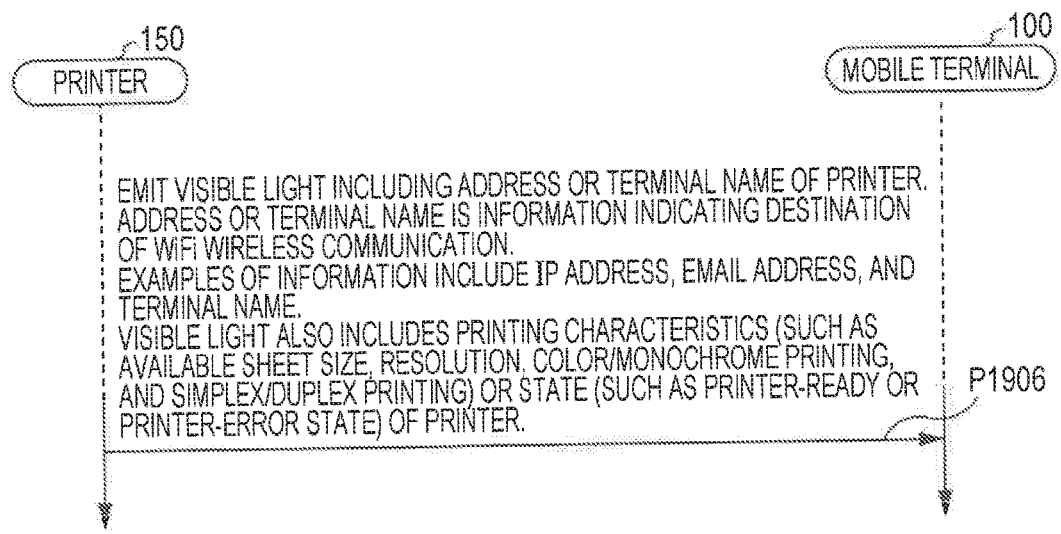
FIG. 21 is a flowchart illustrating an example process according to the exemplary embodiment.

FIG. 21 is a flowchart illustrating an example process according to this exemplary embodiment.

Step P306 in the flowchart illustrated by way of example in FIG. 4 may be replaced with step P1906 illustrated by way of example in FIG. 21.

In step P1906, the printer 150 emits visible light including the address or terminal name of the printer 150 to the mobile terminal 100. The address or terminal name is an example of designation information indicating the destination of WiFi wireless communication. Examples of the designation information include the IP address, the email address, and the terminal name. The visible light may also include the printing characteristics of the printer 150 (such as an available sheet size, a resolution, color/monochrome printing, and simplex/duplex printing) or the state of the printer 150 (such as the printer-ready state or printer-error state).

Figure 22:
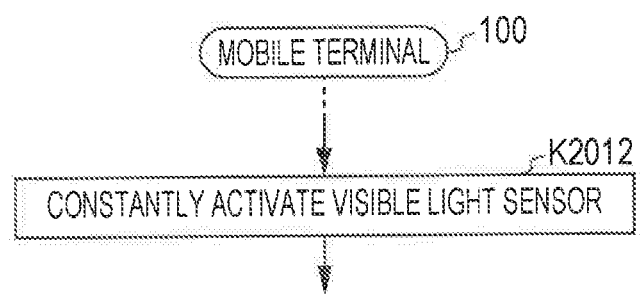
FIG. 22 is a flowchart illustrating an example process according to the exemplary embodiment.

FIG. 22 is a flowchart illustrating an example process according to this exemplary embodiment.

Step K312 in the flowchart illustrated by way of example in FIG. 5 may be replaced with step K2012 illustrated by way of example in FIG. 22.

In step K2012, the visible light sensor is constantly activated.

This operation eliminates the need for the operation of "stopping the operation of the sensor" in step K312.

Figure 23:
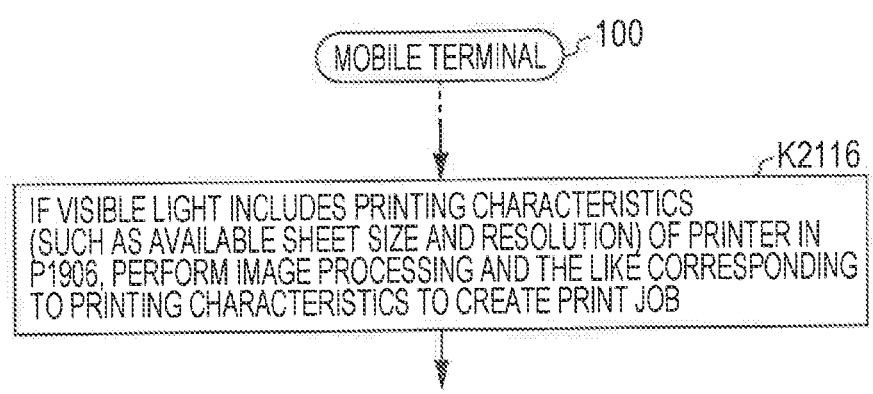
FIG. 23 is a flowchart illustrating an example process according to the exemplary embodiment.

FIG. 23 is a flowchart illustrating an example process according to this exemplary embodiment.

Step K316 in the flowchart illustrated by way of example in FIG. 5 may be replaced with step K2116 illustrated by way of example in FIG. 23.

In step K216, if the visible light includes the printing characteristics of the printer 150 (such as an available sheet size and a resolution) in step P1906, the mobile terminal 100 performs image processing and the like (such as specifying a selected sheet, increasing or reducing the size of an image, and converting a color image into a black-and-white, or monochrome, image) corresponding to the printing characteristics to create a print job.

Figure 24:
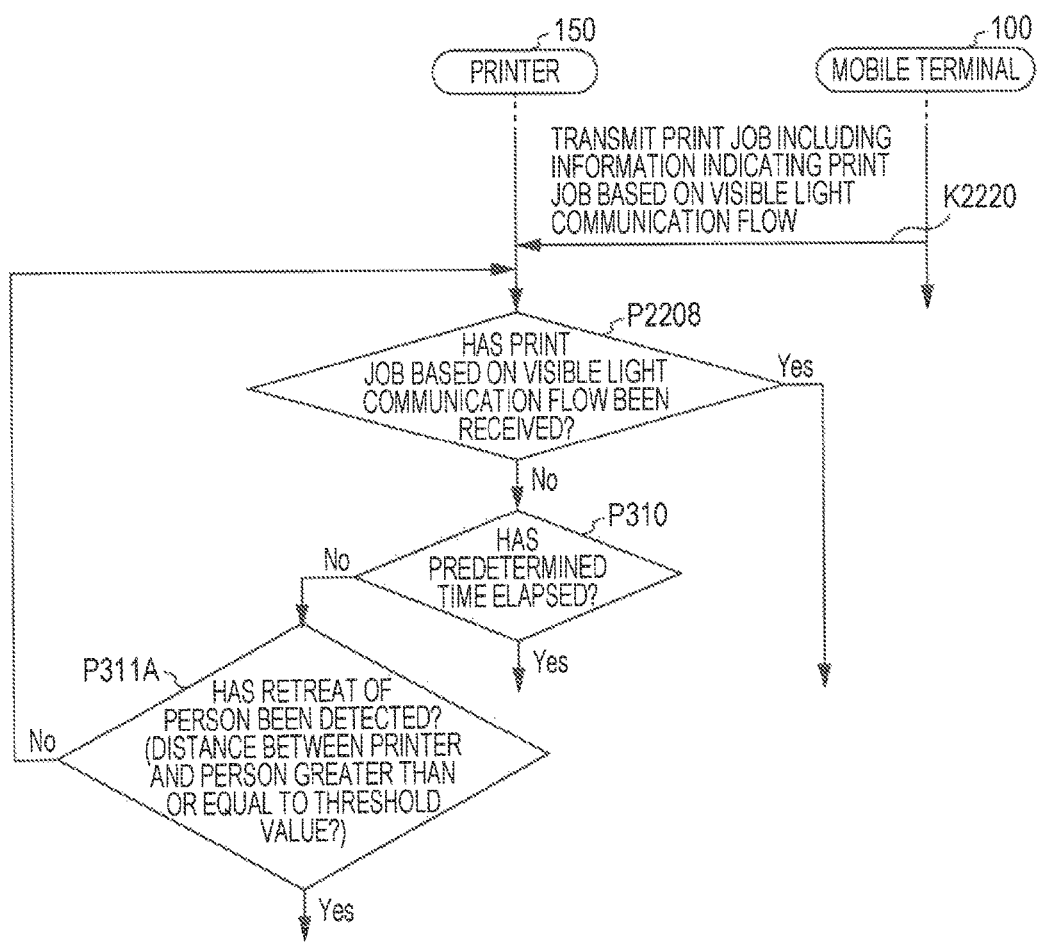
FIG. 24 is a flowchart illustrating an example process according to the exemplary embodiment.

FIG. 24 is a flowchart illustrating an example process according to this exemplary embodiment.

Step K320 in the flowchart illustrated by way of example in FIG. 5 may be replaced with step K2220 illustrated by way of example in FIG. 24, and step P308 in the flowchart illustrated by way of example in FIG. 5 may he replaced with step P2208 illustrated by way of example in FIG. 24.

In step K2220, a print job including information indicating a print job based on this visible light communication flow ("information indicating that communication (communication in step K2220) is being performed in response to receipt, via visible light communication, of designation information for designating the printer 150") is communicated from the mobile terminal 100 to the printer 150.

In step P2208, the printer 150 determines whether or not a print job based on the visible light communication flow has been received. If such a print job has been received, the process proceeds to step P316, or otherwise, the process proceeds to step P310.

In step P310, the printer 150 determines whether or not a predetermined time (e.g., five minutes) has elapsed. If the predetermined time has elapsed, the process proceeds to step P312, or otherwise, the process proceeds to step P311A.

In step P311A, the printer 150 determines whether or not a retreat of a person has been detected (whether or not the distance between the printer 150 and the person is greater than or equal to a threshold). If a retreat of a person has been detected, the process proceeds to step P311B, or otherwise, the process returns to step P2208. If a face has been recognized, this determination may be performed in accordance with whether or not the person whose face has been recognized is the same as the person detected in step P304. Either of the determination processes of steps P310 and P311A may be performed first.

Without the processing of step P2208, the printer 150 will stop emitting light even when a print job that is irrelevant to this visible light communication flow is received via WiFi or the like, and terminate the current process flow. This requires the user to restart the process flow.

Through the processing of step P2208, even when an irrelevant print job that is not created through the visible light communication flow is received, the current process flow is not terminated. The printer 150 waits for a print job based on this visible light communication flow to be received. As a result, an operation intended by the user is performed. Note that during the waiting time, the printer 150 may perform printing in accordance with an irrelevant print job that is not created through this visible light communication flow.

An example hardware configuration of the mobile terminal 100 and the printer 150 according to this exemplary embodiment will be described with reference to FIG. 25.

Figure 25:
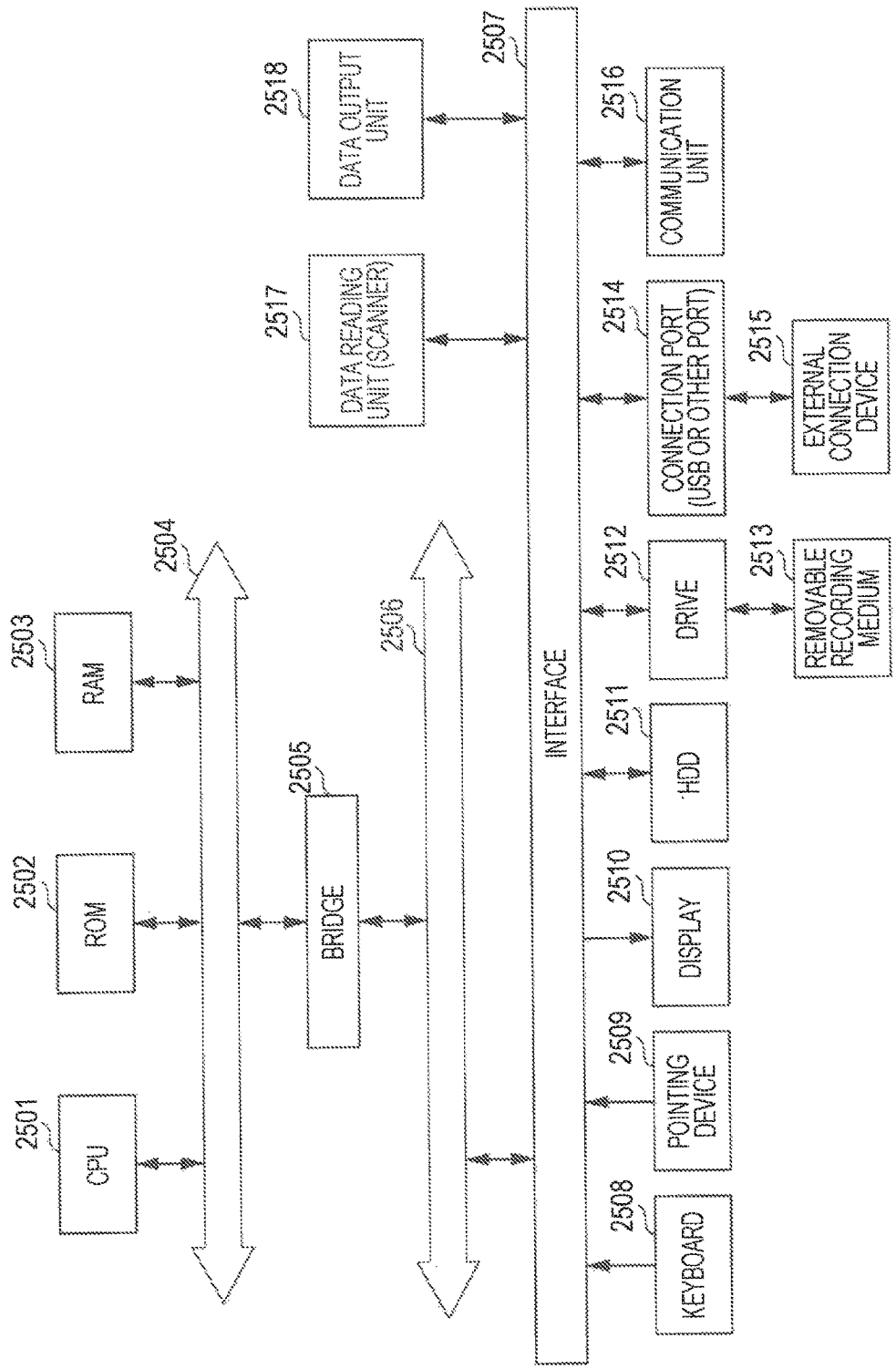
FIG. 25 is a block diagram illustrating an example hardware configuration of a computer that implements the exemplary embodiment.

The configuration illustrated in FIG. 25 is implemented by a personal computer (PC), for example. An example hardware configuration including a data reading unit 2517, such as a scanner, and a data output unit 2518, such as a printer, is illustrated. The mobile terminal 100 may not necessarily include the data reading unit 2517 or the data output unit 2518.

A CPU 2501 is a controller that executes processing in accordance with a computer program describing the execution sequence of the various modules described in the exemplary embodiment described above, namely, the visible light communication module 105, the communication module 110, the communication control module 115, the user interface module 120, the printer list management module 130, the visible light communication module 155, the communication module 160, the communication control module 165, the user interface module 170, the print control module 175, the printing module 185, the light emission control module 190, and the approach detection module 195.

A read only memory (ROM) 2502 stores a program, computation parameters, and other data used by the CPU 2501. A random access memory (RAM) 2503 stores a program to be executed by the CPU 2501 and parameters and the like that change as appropriate in accordance with the executed program. The CPU 2501, the ROM 2502, and the RAM 2503 are connected to one another via a host bus 2504. The host bus 2504 is implemented as, for example, a CPU bus.

The host bus 2504 is connected to an external bus 2506, such as a Peripheral Component interconnect/interface (PCI) bus, via a bridge 2505.

A keyboard 2508 and a pointing device 2509, such as a mouse, are devices operated by an operator. A display 2510 may be a liquid crystal display device or a cathode ray tube (CRT) display and displays various information as text and/or image information. The display 2510 may also be a touch screen or any other device having both the functions of the pointing device 2509 and the display 2510.

A hard disk drive (HDD) 2511 has contained therein a hard disk (which may be a flash memory or the like). The HDD 2511 drives the hard disk to record or reproduce information and a program to be executed by the CPU 2501. The hard disk implements the functions of the file storage module 125, the file storage module 180, and so on. Various data, computer programs, and so on are also stored.

A drive 2512 reads data or a program recorded on a removable recording medium 2513 mounted on the drive 2512, such as a magnetic disk, an optical disk, a magneto-optical disk, or a semiconductor memory, and supplies the data or program to the RAM 2503 connected via an interface 2507, the external bus 2506, the bridge 2505, and the host bus 2504. The removable recording medium 2513 is also available as a data recording area.

A connection port 2514 is a port to which an external connection device 2515 is connected, and has a connection part supporting a standard such as Universal Serial Bus (USB) or IEEE 1394. The connection port 2514 is connected to the CPU 2501 and so on via the interface 2507, the external bus 2506, the bridge 2505, the host bus 2504, and so on. A communication unit 2516 is connected to a communication line to execute a process for data communication with external devices. Examples of the communication include, as described above, visible light communication and wireless communication other than visible light communication. The data reading unit 2517 may be a scanner, for example, and executes a process for reading documents.

The data output unit 2518 may be a printer, for example, and executes a process for outputting document data.

The hardware configuration of the mobile terminal 100 and the printer 150 illustrated in FIG. 25 is an example configuration. The configuration according to this exemplary embodiment is not limited to the configuration illustrated in FIG. 25 and may be any configuration that is capable of implementing the modules described above in this exemplary embodiment. For example, some of the modules may be implemented as dedicated hardware (for example, an application specific integrated circuit (ASIC), etc.), or other modules may be included in an external system and connected via a communication line. Alternatively, multiple systems each illustrated in FIG. 25 may be interconnected via a communication line so as to operate in cooperation with each other. In addition, the modules may be incorporated in, in particular, a personal computer or any other device such as a mobile information communication device (examples of which include a mobile phone, a smartphone, a mobile device, and a wearable computer), an information home appliance, a robot, a copying machine, a facsimile machine, a scanner, a printer, or a multifunction device (an image processing device having two or more of the functions of a scanner, a printer, a copying machine, a facsimile machine, and other devices).

In a comparison process in the description of the exemplary embodiment described above, the expressions "greater than or equal to", "less than or equal to", "greater than", and "smaller than (less than)" may be "greater than", "smaller than (less than)", "greater than or equal to", and "less than or equal to", respectively, as long as consistency in the combination is maintained.

The program described above may be stored in a recording medium to be provided or may be provided via a communication medium. In this case, for example, the program described above may be implemented as a "computer-readable recording medium storing the program".

The "computer-readable recording medium storing the program" refers to a recording medium readable by a computer and having the program recorded thereon, which is used for installing and executing the program, distributing the program, or any other purpose.

Examples of the recording medium include digital versatile discs (DVDs), such as discs based on standards created by the DVD Forum, namely, "DVD-R, DVD-RW, and DVD-RAM", and discs based on standards created by the DVD+RW Alliance, namely, "DVD+R and DVD+RW", compact discs (CDs), such as a compact disc read-only memory (CD-ROM), a CD-Recordable (CD-R) disc, and a CD-Rewritable (CD-RW) disc, Blu-ray Disc (registered trademark), a magneto-optical (MO) disk, a flexible disk (FD), a magnetic tape, a hard disk, a read-only memory (ROM), an electrically erasable programmable read-only memory (EEPROM (registered trademark)), a flash memory, a RAM, and a secure digital (SD) memory card.

All or part of the program described above may be recorded on the recording medium described above for storage or distribution, for example. Alternatively, all or part of the program described above may be transmitted via communication by using a transmission medium such as a wired network, a wireless communication network, or a combination thereof that is used for a communication architecture such as a LAN, a metropolitan area network (MAN), a wide area network (WAN), the Internet, an intranet, or an extranet, or may be carried on carrier waves.

Additionally, the program described above may be part or all of another program, or may be recorded on a recording medium together with an individual program. Alternatively, the program may be divided into pieces which are recorded on plural recording media. Moreover, the program may be recorded in any form that is restorable, such as in compressed or encrypted form.

The visible light for use in visible light communication according to this exemplary embodiment may be diffused visible light, such as illumination of a ceiling light, or converging visible light, such as illumination of a flashlight. Converging visible light is easier for a user to use than diffused visible light since converging visible light is more easily applied to only the desired destination.

The exemplary embodiment described above may be implemented using the following approaches. It is to be understood that the exemplary embodiment described above may be combined with the following approaches.

[A1] An image output apparatus including:
   a transmitter that transmits, via visible light communication, designation information for designating the image output apparatus as a destination of second communication; and
   a receiver that receives a print instruction from a mobile information processing apparatus via the second communication in accordance with the designation information,
   wherein the transmitter stops emitting light for visible light communication in response to the receiver receiving a print instruction.

[A2] The image output apparatus according to [A1], further including:
   a detector that detects a presence of a person,
   wherein the transmitter starts visible light communication in response to detection of a presence of a person.

[A3] The image output apparatus according to [A1] or [A2], wherein
   the transmitter starts visible light communication in response to receipt of an instruction from the mobile information processing apparatus via visible light communication to transmit the designation information for designating the image output apparatus.

[A4] The image output apparatus according to any one of [A1] to [A3], wherein
   the transmitter transmits a characteristic or state of the image output apparatus via visible light communication.

[A5] The image output apparatus according to any one of [A1] to [A4], further including:
   a controller that performs control to perform printing in accordance with the print instruction when the print instruction is received and when second information indicating that the second communication is being performed in accordance with the designation information is received.

[A6] The image output apparatus according to any one of [A1] to [A5], further including:
   a providing unit that provides a suggestion of an operation to be performed by a user when transmission is to be performed via visible light communication, the operation including positioning the mobile information processing apparatus so that visible light is applied to the mobile information processing apparatus.

[A7] An image output apparatus including:
   a transmitter that transmits, via visible light communication, designation information for designating the image output apparatus as a destination of second communication;

a receiver that receives a print instruction from a mobile information processing apparatus via the second communication in accordance with the designation information; and
a controller that controls the transmitter
to stop the transmission via visible light communication when the print instruction is received and when second information indicating that the second communication is being performed in accordance with the designation information is received, and
not to stop the transmission via visible light communication when the print instruction is received and when the second information is not received.

[A8] An image output system including:
a mobile information processing apparatus; and
an image output apparatus,
the mobile information processing apparatus including
a first receiver that receives, via visible light communication, designation information for designating the image output apparatus as a destination of second communication, and
a first transmitter that transmits a print instruction to the image output apparatus via the second communication in accordance with the designation information,
the image output apparatus including
a second transmitter that transmits, via visible light communication, the designation information for designating the image output apparatus as a destination of the second communication, and
a second receiver that receives a print instruction from the mobile information processing apparatus via the second communication in accordance with the designation information,
wherein the second transmitter stops emitting light for visible light communication in response to the second receiver receiving a print instruction.

[A9] The image output system according to [A8], wherein
the first transmitter transmits the print instruction to the image output apparatus without accepting an operation of selecting the image output apparatus that is a destination of the print instruction:

[A10] The image output system according to [A8] or [A9], wherein
the first receiver tops reception via visible light communication when the designation information is received.

[A11] The image output system according to any one of [A8] to [A10], wherein
the second transmitter transmits a characteristic or state of the image output apparatus via visible light communication,
the mobile information processing apparatus further includes
a generator that: generates, if the first receiver receives a characteristic or state of the image output apparatus from the image output apparatus via visible light communication, the print instruction in accordance with the received characteristic or state, and
the first transmitter transmits the print instruction generated by the generator.

[A12] The image output system according to any one of [A8] to [A11], wherein
the first transmitter transmits the print instruction and second information indicating that the second communication is being performed in accordance with the designation information.

[A13] The image output system according to any one of [A8] to [A12], wherein
the mobile information processing apparatus further includes
a providing unit that provides a suggestion of an operation to be performed by a user when the designation information for designating the image output apparatus is being received via visible light communication, the operation including positioning the mobile information processing apparatus so that visible light is applied to the mobile information processing apparatus.

[A14] The image output system according to any one of [A8] to [A13], wherein
the mobile information processing apparatus further includes
a deletion unit that deletes the designation information for designating the image output apparatus, which has been received by the first receiver, after transmission has been performed by the first transmitter.

[A15] The image output system according to any one of [A8] to [A14], wherein
the first transmitter transmits the print instruction and second information indicating that the second communication is being performed in accordance with the designation information.

[A16] A non-transitory computer readable medium storing a program causing a computer included in an image output apparatus to execute a process for image processing, the image output apparatus including a transmitter, the process including:
transmitting, from the transmitter via visible light communication, designation information for designating the image output apparatus as a destination of second communication;
receiving a print instruction from a mobile information processing apparatus via the second communication in accordance with the designation information; and
causing the transmitter to stop transmitting the designation information via visible light communication when the print instruction is received.

[A17] A non-transitory computer readable medium storing a program causing a computer included in an image output apparatus to execute a process for image processing, the image output apparatus including a transmitter, the process including:
transmitting, from the transmitter via visible light communication, designation information for designating the image output apparatus as a destination of second communication;
receiving a print instruction from a mobile information processing apparatus via the second communication in accordance with the designation information; and
controlling the transmitter
to stop the transmission via visible light communication when the print instruction is received and when second information indicating that the second communication is being performed in accordance with the designation information is received, and
not to stop the transmission via visible light communication when the print instruction is received and when the second information is not received.

The approaches described above have the following advantages.

In the image output apparatus according to [A1], it may be possible to receive, via visible light communication, designation information for designating the image output apparatus. It may also be possible to stop emitting light for visible light communication in response to receipt of a print instruction.

In the image output apparatus according to [A2], it may be possible to start visible light communication in response to detection of a presence of a person.

In the image output apparatus according to [A3], it may be possible to start visible light communication in response to receipt of an instruction from a mobile information processing apparatus via visible light communication to transmit the designation information for designating the image output apparatus.

In the image output apparatus according to [A4], it may be possible to transmit a characteristic or state of the image output apparatus via visible light communication.

In the image output apparatus according to [A5], it may be possible to perform control to perform printing in accordance with a print instruction when the print instruction is received and when second information indicating that the second communication is being performed in accordance with the designation information is received.

In the image output apparatus according to [A6], the user may readily understand the operation to be performed to perform transmission via visible light communication.

In the image output apparatus according to [A7], it may be possible to control the transmitter to stop the transmission via visible light communication when the print instruction is received and when second information indicating that the second communication is being performed in accordance with the designation information is received, and not to stop the transmission via visible light communication when the print instruction is received and when the second information is not received.

In the image output system according to [A8], it may be possible to receive, via visible light communication, designation information for designating the image output apparatus. It may also be possible to stop emitting light for visible light communication in response to receipt of a print instruction.

In the image output system according to [A9], it may be possible to transmit a print instruction to the image output apparatus without accepting an operation of selecting the image output apparatus.

In the image output system according to [A10], it may be possible to stop reception using visible light communication when the designation information is received.

In the image output system according to [A11], it may be possible to generate a print instruction in accordance with a characteristic or state of the image output apparatus.

In the image output system according to [A12], it may be possible to transmit the print instruction and second information indicating that the second communication is being performed in accordance with the designation information.

In the image output system according to [A13], the user may readily understand the operation to be performed to receive, via visible light communication, designation information for designating the image output apparatus.

In the image output system according to [A14], it may be possible to delete the designation information for designating the image output apparatus, which has been received by the first receiver, after transmission has been performed by the first transmitter.

In the image output system according to [A15], it may be possible for the first transmitter to transmit the print instruction and second information indicating that the second communication is being performed in accordance with the designation information.

In the non-transitory computer readable medium according to [A16], it may be possible to receive, via visible light communication, designation information for designating the image output apparatus. It may also be possible to stop transmitting the designation information via visible light communication when a print instruction is received.

In the non-transitory computer readable medium according to [A17], it may be possible to control the transmitter to stop the transmission via visible light communication when the print instruction is received and when second information indicating that the second communication is being performed in accordance with the designation information is received, and not to stop the transmission via visible light communication when the print instruction is received and when the second information is not received.

The exemplary embodiment described above may also be implemented using the following approaches.

[B1] An image output apparatus including:
  a transmitter that transmits, via visible light communication, designation information for designating the image output apparatus as a destination of second communication;
  a receiver that receives a print instruction from a mobile information processing apparatus via the second communication in accordance with the designation information; and
  a providing unit that, when the print instruction is not received within a predetermined time, causes the transmitter to stop transmitting the designation information via visible light communication and provides an indication that no print instruction has been received.

[B2] The image output apparatus according to [B1], further including:
  a detector that detects a presence of a person,
  wherein the transmitter starts visible light communication in response to detection of a presence of a person.

[B3] The image output apparatus according to [B1] or [B2], wherein
  the transmitter starts visible light communication in response to receipt of an instruction from the mobile information processing apparatus via visible light communication to transmit the designation information for designating the image output apparatus.

[B4] The image output apparatus according to any one of [B1] to [B3], wherein
  the transmitter transmits a characteristic or state of the image output apparatus via visible light communication.

[B5] The image output apparatus according to any one of [B1] to [B4], further including:
  a controller that performs control to perform printing in accordance with the print instruction When the print instruction is received and when second information indicating that the second communication is being performed in accordance with the designation information is received.

[B6] The image output apparatus according to any one of [B1] to [B5], further including:
  a providing unit that, provides a suggestion of an operation to be performed by a user when transmission is to be performed via visible light communication, the operation including positioning the mobile information processing apparatus so that visible light is applied to the mobile information processing apparatus.

[B7] The image output apparatus according to any one of [B1] to [B6], further including:
  a controller that controls the transmitter
  to stop the transmission via visible light communication when the print instruction is received and When second information indicating that the second communication is being performed in accordance with the designation information is received, and not to stop the transmission via visible light communication when the print instruction is received and when the second information is not received.

[B8] An image output system including:

a mobile information processing apparatus; and an image output apparatus, the mobile information processing apparatus including a first receiver that receives, via visible light communication, designation information for designating the image output apparatus as a destination of second communication, and a first transmitter that transmits a print instruction to the image output apparatus via the second communication in accordance with the designation information, the image output apparatus including a second transmitter that transmits, via visible light communication, the designation information for designating the image output apparatus as a destination of the second communication, a second receiver that receives a print instruction from the mobile information processing apparatus via the second communication in accordance with the designation information, and a providing unit that, when the print instruction is not received within a predetermined time, causes the transmitter to stop transmitting the designation information via visible light communication and provides an indication that no print instruction has been received.

[B9] The image output system according to [B8], wherein the first transmitter transmits the print instruction to the image output apparatus without accepting an operation of selecting the image output apparatus that is a destination of the print instruction.

[B10] The image output system according to [B8] or [B9], wherein the first receiver stops reception via visible light communication when the designation information is received.

[B11] The image output system according to any one of [B8] to [B10], wherein the second transmitter transmits a characteristic or state of the image output apparatus via visible light communication, the mobile information processing apparatus further includes a generator that generates, if the first receiver receives a characteristic or state of the image output apparatus from the image output apparatus via visible light communication, the print instruction in accordance with the received characteristic or state, and the first transmitter transmits the print instruction generated by the generator.

[B12] The image output system according to any one of [B8] to [B11], wherein the first transmitter transmits the print instruction and second information indicating that the second communication is being performed in accordance with the designation information.

[B13] The image output system according to any one of [B8] to [B12], wherein the mobile information processing apparatus further includes a providing unit that provides a suggestion of an operation to be performed by a user when the designation information for designating the image output apparatus is being received via visible light communication, the operation including positioning the mobile information processing apparatus so that visible light is applied to the mobile information processing apparatus.

[B14] The image output system according to any one of [B8] to [B13], wherein the mobile information processing apparatus further includes a deletion unit that deletes the designation information for designating the image output apparatus, which has been received, by the first receiver, after transmission has been performed by the first transmitter.

[B15] The image output system according to any one of [B8] to [B14], wherein the first transmitter transmits the print instruction and second information indicating that the second communication is being performed in accordance with the designation information.

[B16] A non-transitory computer readable medium storing a program causing a computer included in an image output apparatus to execute a process for image processing, the image output apparatus including a transmitter and a providing unit, the process including:

transmitting, from the transmitter via visible light communication, designation information for designating the image output apparatus as a destination of second communication.;

receiving a print instruction from a mobile information processing apparatus via the second communication in accordance with the designation information; and when the print instruction is not received within a predetermined time, causing the transmitter to stop transmitting the designation information via visible light communication and causing the providing unit to provide an indication that no print instruction has been received.

The approaches described above have the following advantages.

In the image output apparatus according to [B1], it may be possible to transmit, via visible light communication, designation information for designating the image output apparatus to establish communication with the image output apparatus.

In the image output apparatus according to [B2], it may be possible to start visible light communication in response to detection of a presence of a person.

In the image output apparatus according to [B3], it may be possible to start visible light communication in response to receipt of an instruction from a mobile information processing apparatus via visible light communication to transmit the designation information for designating the image output apparatus.

In the image output apparatus according to [B4], it may be possible to transmit a characteristic or state of the image output apparatus via visible light communication.

In the image output apparatus according to [B5], it may be possible to perform control to perform printing in accordance with a print instruction when the print instruction is received and when second information indicating that the second communication is being performed in accordance with the designation information is received.

In the image output apparatus according to [B6], the user may readily understand the operation to be performed to perform transmission via visible light communication.

In the image output apparatus according to [B7], it may be possible to control the transmitter to stop the transmission via visible light communication when the print instruction is received and when second information indicating that the second communication is being performed in accordance with the designation information is received, and not to stop the transmission via visible light communication when the print instruction is received and when the second information is not received.

In the image output system according to [B8], it may be possible to transmit and receive, via visible light communication, designation information for designating the image output apparatus.

In the image output system according to [B9], it may be possible to transmit a print instruction to the image output apparatus without accepting an operation of selecting the image output apparatus.

In the image output system according to [B10], it may be possible to stop reception using visible light communication when the designation information is received.

In the image output system according to [B11], it may be possible to generate a print instruction in accordance with a characteristic or state of the image output apparatus.

In the image output system according to [B12], it may be possible to transmit the print instruction and second information indicating that the second communication is being performed in accordance with the designation information.

In the image output system according to [B13], the user may readily understand the operation to be performed to receive, via visible light communication, designation information for designating the image output apparatus.

In the image output system according to [B14], it may be possible to delete the designation information for designating the image output apparatus, which has been received by the first receiver, after transmission has been performed by the first transmitter.

In the image output system according to [B15], it may be possible for the first transmitter to transmit the print instruction and second information indicating that the second communication is being performed in accordance with the designation information.

In the non-transitory computer readable medium according to [B16], it may be possible to transmit, via visible light communication, designation information for designating the image output apparatus to establish communication with the image output apparatus.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printer comprising:
    an imaging unit;
    a transmitter that transmits light to detect a presence of a person and that transmits designation information via visible light communication, the designation information being information for designating the printer as a destination of wireless communication; and
    a receiver that receives a print instruction from a mobile information processing apparatus via the wireless communication in accordance with the designation information.

2. The printer according to claim 1, wherein the imaging unit comprises a detection imaging unit that detects an approach of a person or a face imaging unit that captures an image of the face of a person, and
    wherein the transmitter is located near either the detection imaging unit or the face imaging unit.

3. The printer according to claim 1, wherein the transmitter stops emitting light for visible light communication in response to the receiver receiving a print instruction.

4. The printer according to claim 1, wherein the transmitter starts visible light communication in response to receipt of an instruction from the mobile information processing apparatus via visible light communication to transmit designation information for designating the printer.

5. The printer according to claim 1, wherein the transmitter transmits a characteristic or state of the printer via visible light communication.

6. The printer according to claim 1, further comprising:
    a controller that performs control to perform printing in accordance with the print instruction when the print instruction is received and when second information indicating that the wireless communication is being performed in accordance with the designation information received via visible light communication is received.

7. The printer according to claim 1, further comprising:
    a communication controller that controls the transmitter
    to stop the transmission via visible light communication when the print instruction is received and when second information indicating that the wireless communication is being performed in accordance with the designation information received via visible light communication is received, and
    not to stop the transmission via visible light communication when the print instruction is received and when the second information is not received.

8. The printer according to claim 1, further comprising:
    a processor that, when the print instruction is not received within a predetermined time, causes the transmitter to stop transmitting the designation information via visible light communication and provides an indication that no print instruction has been received.

9. The printer according to claim 1, wherein the wireless communication comprises communication different from visible light communication.

10. The printer according to claim 1, further comprising:
    a camera that captures the transmitted light to detect the presence of the person and receives information transmitted via visible light communication.

11. A printer comprising:
    a transmitter that transmits light to detect a presence of a person and that transmits designation information via visible light communication with a low-power-consumption mode enabled, the designation information being information for designating the printer as a destination of wireless communication; and
    a receiver that receives a print instruction from a mobile information processing apparatus via the wireless communication in accordance with the designation information.

12. A printer comprising:
    a transmitter that transmits light to (1) detect a presence of a person and (2) transmit designation information via visible light communication, the designation information being information for designating the printer as a destination of wireless communication;

a receiver that receives a print instruction from a mobile information processing apparatus via the wireless communication in accordance with the designation information; and a detector that detects the light transmitted to detect a presence of a person, wherein in response to the detector detecting a presence of a person, the transmitter starts visible light communication with a low-power-consumption mode enabled.

13. The printer according to claim 12, further comprising: an imaging unit.

14. A printer comprising:

a transmitter that transmits designation information to a light-receiving unit of a mobile information processing apparatus via visible light communication, the designation information being information for designating the printer as a destination of wireless communication; and a processor configured to provide a suggestion of an operation to be performed by a user when the designation information is to be transmitted to the mobile information processing apparatus via the visible light communication, the operation including positioning the light-receiving unit of the mobile information processing apparatus so that visible light is applied to the light-receiving unit of the mobile information processing apparatus.

15. The printer according to claim 14, further comprising:

a receiver that receives a print instruction from the mobile information processing apparatus via the wireless communication in accordance with the designation information, wherein the transmitter stops emitting light for visible light communication in response to the receiver receiving a print instruction.

16. A mobile information processing apparatus comprising:

a first receiver that receives designation information via visible light communication, the designation information being information for designating a printer as a destination of wireless communication;

a second receiver that receives the designation information via the wireless communication; and a processor that does not add the designation information to a selection list when the designation information is received by the first receiver, the selection list being a list for selecting the printer as a destination of the wireless communication.

17. The mobile information processing apparatus according to claim 16, further comprising:

a transmitter that transmits a print instruction to the printer via the wireless communication in accordance with the designation information.

18. The mobile information processing apparatus according to claim 17, wherein the transmitter transmits the print instruction to the printer without accepting an operation of selecting the printer that is a destination of the print instruction.

19. The mobile information processing apparatus according to claim 17, further comprising:

that the processor further deletes the designation information received by the first receiver, after transmission has been performed by the transmitter.

20. The mobile information processing apparatus according to claim 16, wherein the first receiver stops reception via visible light communication upon receipt of the designation information.

21. The mobile information processing apparatus according to claim 16, further comprising:

the processor further provides a suggestion of an operation to be performed by a user when the designation information for designating the printer is being received via the visible light communication, the operation including positioning the mobile information processing apparatus so that visible light is applied to the mobile information processing apparatus.

* * * * *